US008045433B2

(12) United States Patent
Onojima

(10) Patent No.: US 8,045,433 B2
(45) Date of Patent: Oct. 25, 2011

(54) COIL CONTROLLING FOR OPTICAL PICK-UP

(75) Inventor: Noboru Onojima, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 339 days.

(21) Appl. No.: 12/395,354

(22) Filed: Feb. 27, 2009

(65) Prior Publication Data

US 2009/0219794 A1    Sep. 3, 2009

(30) Foreign Application Priority Data

Feb. 29, 2008 (JP) ................................. 2008-050378
Sep. 30, 2008 (JP) ................................. 2008-252770

(51) Int. Cl.
 *G11B 20/18* (2006.01)
(52) U.S. Cl. ................ 369/53.19; 369/53.23; 369/44.23
(58) Field of Classification Search ............... 369/53.19, 369/44.11, 44.25, 44.27, 44.28, 44.29, 112.01, 369/112.06, 112.11, 112.18
See application file for complete search history.

(56) References Cited

U.S. PATENT DOCUMENTS

| 6,185,168 B1 * | 2/2001 | Kato et al. ................. 369/44.23 |
| 2004/0213115 A1 * | 10/2004 | Nakata et al. .............. 369/53.23 |
| 2008/0095018 A1 * | 4/2008 | Hibino et al. ............. 369/112.24 |
| 2009/0316539 A1 * | 12/2009 | Mikami et al. ............. 369/44.32 |

FOREIGN PATENT DOCUMENTS

JP    2006-024277    1/2006

* cited by examiner

*Primary Examiner* — Tan X Dinh
(74) *Attorney, Agent, or Firm* — Fish & Richardson P.C.

(57) ABSTRACT

A pickup apparatus including: at least a coil constituting an actuator, a signal to be sent to the coil being obtained by calculation using an algorithm on the basis of at least one of a focus error signal and a tracking error signal.

10 Claims, 12 Drawing Sheets

COIL CONTROLLING FOR OPTICAL PICK-UP

CROSS-REFERENCE TO RELATED APPLICATION

This application claims the benefit of priority to Japanese Patent Application Nos. 2008-050378 and 2008-252770, filed Feb. 29, 2008 and Sep. 30, 2008, respectively, of which full contents are incorporated herein by reference.

BACKGROUND OF THE INVENTION

1. Field of the Invention

The present invention relates to a pickup apparatus capable of reproducing data, information, signals recorded in various sorts of media such as various optical discs and the like for example, or capable of recording the data, information, signals in the various sorts of media such as various writable or rewritable optical discs and the like, and relates to a disc apparatus including the pickup apparatus.

2. Description of the Related Art

A signal and the like recorded in the media such as an optical disc and the like are reproduced by means of a laser light (LASER: light amplification by stimulated emission of radiation) emitted from an optical pickup apparatus. Also, the signal and the like are recorded in the media such as the optical disc and the like by means of the laser light emitted from the optical pickup apparatus. The optical pickup apparatus is incorporated into an optical disc apparatus capable of containing a media such as an optical disc and the like.

An actuator included in the optical pickup apparatus is subject to a restriction that a tracking coil is arranged so that an electromagnetic power working point matches the center of gravity of a movable actuator main body portion and the center of rotation when the movable actuator main body portion is statically rolled with a frequency of approximately 1 Hz (hertz) for example. This restriction is solved by wiring a part of the tracking coil in a coil portion for tilt for example.

Also, there is introduced, for example, an optical pickup apparatus in which: the number of components is small, size reduction is possible, and response is excellent, by devising a magnetization pattern of a magnet, and by devising arrangement of a focus coil, a tracking coil, and a tilt coil (see Japanese Patent Laid-Open Publication No. 2006-24277, pages 1, 5 and FIGS. 1 to 7, for example).

However, in the above-mentioned conventional optical pickup apparatus, it is difficult to wire a part of the tracking coil in the coil portion for tilt, and therefore the cost of manufacturing the optical pickup apparatus in such a manner is increased, which is considered as a problematic disadvantage. Also, there are concerns that the price of the optical disc apparatus is increased with increase in price of the optical pickup apparatus.

Also, in the conventional optical pickup apparatus, there are problems such as IO defects of the movable actuator main body portion in the pickup apparatus and the occurrence of rolling in the movable actuator main body portion having a lens and the like when the pickup apparatus is operated. The IO (incremental object) in this description means a static inclination generated for an object when a force is left exerted slowly on the object, for example. Also, the rolling in this description means a resonance state at a rolling natural frequency for example.

SUMMARY OF THE INVENTION

A pickup apparatus according to an aspect of the present invention comprises: at least a coil constituting an actuator, a signal to be sent to the coil being obtained by calculation using an algorithm on the basis of at least one of a focus error signal and a tracking error signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
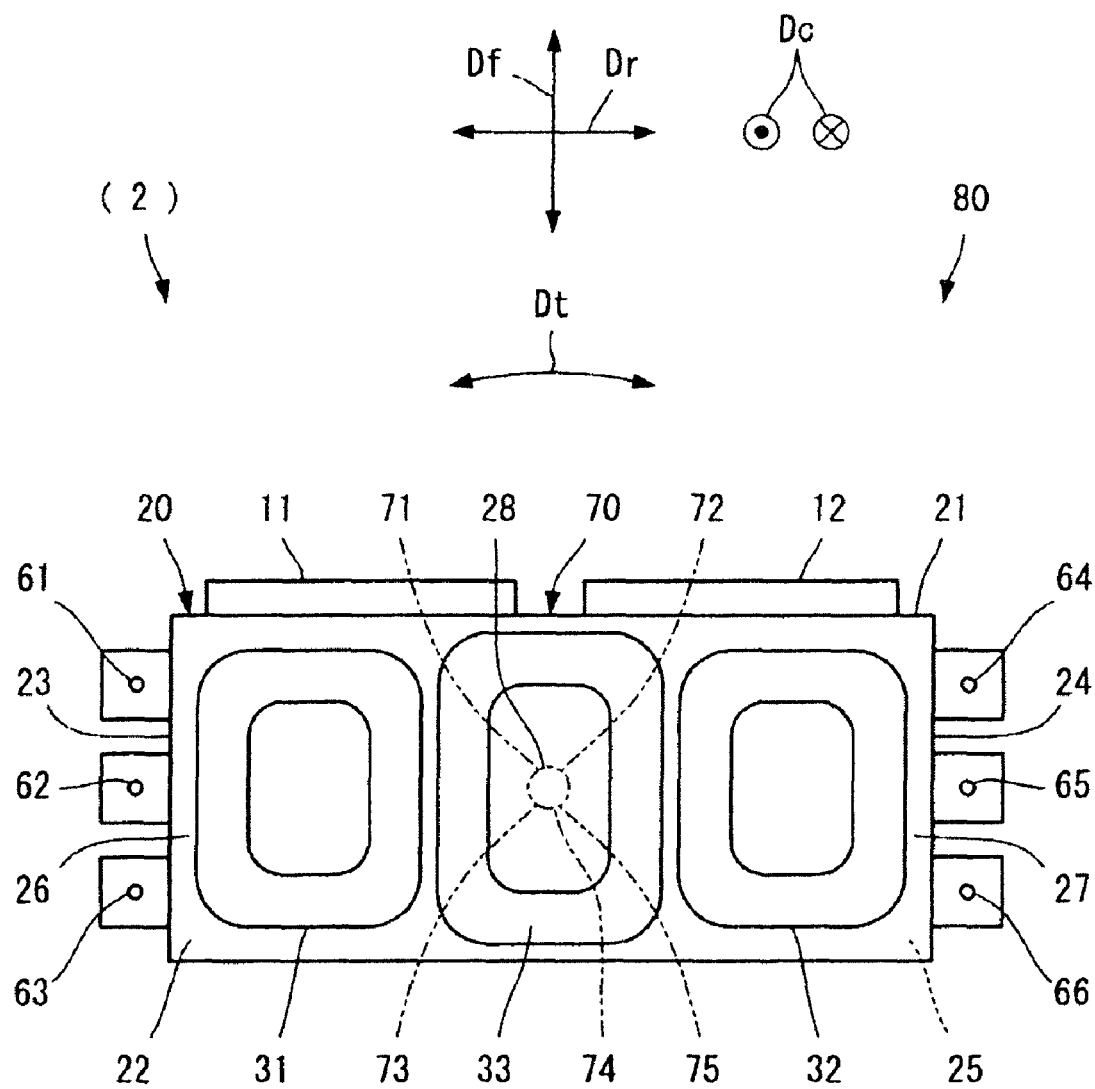
FIG. 1 is a side view illustrating a pickup apparatus according to an embodiment of the present invention.

At least the following details will become apparent from descriptions of this specification and of the accompanying drawings.

The pickup apparatus according to an embodiment of the present invention includes at least a coil constituting an actuator, a signal to be sent to the coil being obtained by calculation using an algorithm on the basis of at least one of a focus error signal and a tracking error signal.

Thereby, in the actuator of the pickup apparatus for example, there can be avoided IO defects for example of an actuator main body portion of the pickup apparatus caused by an error in a manufacturing process of the pickup apparatus and the occurrence of rolling in the actuator main body portion having a coil in operation of the actuator of the pickup apparatus. By providing the algorithm to carry out calculations, the occurrence of each of the above problems is avoided. The IO (incremental object) means a static inclination generated for an object when a force is left exerted slowly on the object, for example. Also, the rolling in an embodiment of the present invention means a resonance state at a rolling natural frequency for example. Also, the algorithm means a calculation procedure or a processing procedure and the like for example.

In the pickup apparatus according to an embodiment of the present invention, the signal to be sent to the coil is obtained by calculations on the basis of the following formula (A):

$$\begin{bmatrix} FO1 \\ FO2 \\ TR \end{bmatrix} = \begin{bmatrix} A11 & A12 & A13 & A14 \\ A21 & A22 & A23 & A24 \\ A31 & A32 & A33 & A34 \end{bmatrix} \begin{bmatrix} FE \\ TILT \\ TE \\ TE^2 \end{bmatrix} \quad (A)$$

where FO1 represents a driving signal to be input into a first focus/tilt coil; FO2 represents a driving signal to be input into a second focus/tilt coil; TR represents a driving signal to be input into a tracking coil; A11, A12, A13, A14, A21, A22, A23, A24, A31, A32, A33, and A34 represent coefficients having arbitrary values; FE represents a focus error signal; TE represents a tracking error signal; and TILT represents a correction tilt amount signal.

Thereby, there are avoided IO defects of the actuator main body portion in the pickup apparatus and the occurrence of rolling in the actuator main body portion in the pickup apparatus. In order to optimally distribute driving forces in three directions that are a focus direction, a tracking direction, and a tilt direction, an algorithm on the basis of the above formula (A) is used to calculate a signal to be sent to a coil, thereby avoiding the occurrence of each of the above problems.

The disc apparatus according to an embodiment of the present invention includes at least the above pickup apparatus.

Thereby, there are avoided IO defects for example of the actuator main body portion in the pickup apparatus caused by an error in a manufacturing process of the pickup apparatus for example, and the occurrence of rolling in the actuator main body portion having the coils in operation of the pickup apparatus. By providing an algorithm to carry out calculations, there can be provided the disc apparatus capable of avoiding the occurrence of each of the above problems.

The pickup apparatus according to an embodiment of the present invention is a pickup apparatus capable of reading out a signal from a media and/or writing a signal into the media, including at least a lens configured to irradiate the media with light, a first focus/tilt coil and a second focus/tilt coil configured to drive the lens at least substantially along an optical axis direction of the lens, and a tracking coil configured to drive the lens substantially along a radial direction of the media, in the case where a driving signal to be input into the first focus/tilt coil is defined as FO1, and where a driving signal to be input into the second focus/tilt coil is defined as FO2, and where a driving signal to be input into the tracking coil is defined as TR, and where a focus error signal detected when out-of-focus of the light substantially along the optical axis direction of the lens with respect to the media occurs, is defined as FE, and where a tracking error signal detected when out-of-focus of the light substantially along the radial direction of the media with respect to the media occurs, is defined as TE, and where a correction tilt amount signal for correcting angle misalignment of the objective lens when a focus angle misalignment of the light with respect to the media occurs, is defined as TILT, the driving signal to be input into the first focus/tilt coil being determined on the basis of the following formula (1), and the driving signal to be input into the second focus/tilt coil being determined on the basis of the following formula (2), and the driving signal to be input into the tracking coil being determined on the basis of the following formula (3), $$FO1 = (A11 \times FE) + (A12 \times TILT) + (A13 \times TE) + (A14 \times TE^2) \quad (1)$$

$$FO2 = (A21 \times FE) + (A22 \times TILT) + (A23 \times TE) + (A24 \times TE^2) \quad (2)$$

$$TR = (A31 \times FE) + (A32 \times TILT) + (A33 \times TE) + (A34 \times TE^2) \quad (3)$$

where, the coefficients A11, A12, A13, A14, A21, A22, A23, A24, A31, A32, A33, and A34 have arbitrary values.

Thereby, there are avoided IO defects for example of the pickup apparatus caused by an error in a manufacturing process of the pickup apparatus for example, and the occurrence of rolling of the lens in operation of the pickup apparatus. The IO means a static inclination generated for an object when a force is left exerted slowly on the object, for example. Also, the rolling in an embodiment of the present invention means a resonance state at a rolling natural frequency for example.

In the pickup apparatus according to an embodiment of the present invention, arbitrary values other than zero are input into the coefficients A13 and A23 as necessary, and the coefficients A23 and A13 are opposite to each other in sign.

Thereby, when the lens of the pickup apparatus is driven substantially along a tracking direction that is a direction substantially along a radial direction of the media for example, the occurrence of rolling in the lens of the pickup apparatus is avoided.

In the pickup apparatus according to an embodiment of the present invention, arbitrary values other than zero are input into the coefficients A14 and A24 as necessary.

Thereby, when the lens of the pickup apparatus is driven substantially along a tracking direction that is a direction substantially along a radial direction of the media for example, the occurrence of rolling in the lens of the pickup apparatus is avoided. In the pickup apparatus having three-pole magnetic members arranged side by side corresponding to the three coils that are the first focus/tilt coil, the second focus/tilt coil, and the tracking coil, when the tracking coil of the pickup apparatus is driven along the tracking direction that is a direction along the radial direction of the media, there are concerns that an unnecessary driving force is exerted on the first focus/tilt coil and the second focus/tilt coil along the focus direction that is a direction substantially along the optical axis direction of the lens. However, if rolling is to be generated in the lens of the pickup apparatus when the lens of the pickup apparatus is driven along the tracking direction, the unnecessary driving force exerted on the first focus/tilt coil and the unnecessary driving force exerted on the second focus/tilt coil are cancelled by: inputting an arbitrary value other than zero into the coefficient A14 in the formula (1); inputting an arbitrary value other than zero into the coefficient A2 of the formula (2); inputting the driving signal FO1 expressed by the formula (1) into the first focus/tilt coil; and inputting the driving signal FO2 expressed by the formula (2) into the second focus/tilt coil. The occurrence of rolling in the lens of the pickup apparatus is therefore avoided.

In the pickup apparatus according to an embodiment of the present invention, an arbitrary value other than zero is input into the coefficients A11 and A21 as necessary, and the coefficient A11 and A21 are different from each other.

Thereby, the IO characteristics of the pickup apparatus are improved. If the IO characteristics of the pickup apparatus are poor when the lens of the pickup apparatus is driven substantially along the focus direction, by inputting an arbitrary value other than zero into the coefficient A11 in the formula (1) and inputting an arbitrary value other than zero into the coefficient A21 in the formula (2) such that the coefficients A11 and A21 are different from each other, and by inputting the corrected driving signal FO1 into the first focus/tilt coil and inputting the corrected driving signal FO2 into the second focus/tilt coil, the driving signal FO1 input into the first focus/tilt coil and the driving signal FO2 input into the second focus/tilt coil become resultantly different from each other. The IO characteristics of the pickup apparatus are therefore improved.

In the pickup apparatus according to an embodiment of the present invention, when rolling is to occur in the lens, arbitrary values other than zero are input into the coefficients A13 and A23, and the values to be input into the coefficients A13 and A23 are varied depending on a rolling frequency of the lens.

Thereby, by means of the rolling frequency of the lens, the IO characteristics of the pickup apparatus are compensated or the rolling suppression characteristics of the lens in the pickup apparatus are compensated. For example, by setting a substantially predetermined frequency to a boundary between a low frequency and a high frequency, the IO characteristics of the pickup apparatus are compensated, for example, if the rolling frequency of the lens is a low frequency that is the substantially predetermined frequency or less. Also, the rolling suppression characteristics of the lens in the pickup apparatus are compensated, for example, if the rolling frequency of the lens is a high frequency that exceeds the substantially predetermined frequency.

The pickup apparatus according to an embodiment of the present invention includes a storage portion capable of storing the coefficients A11, A12, A13, A14, A21, A22, A23, A24, A31, A32, A33, and A34.

Thereby, there can be provided a pickup apparatus capable of avoiding IO defects for example of the pickup apparatus caused by an error in a manufacturing process of the pickup apparatus for example and avoiding the occurrence of rolling of the lens in operation of the pickup apparatus.

The disc apparatus according to an embodiment of the present invention includes a control portion configured to carry out calculations on the basis of at least one of the formula (1), the formula (2), and the formula (3).

Thereby, there can be avoided IO defects for example of the pickup apparatus caused by an error in a manufacturing process of the pickup apparatus for example, and the occurrence of rolling of the lens in operation of the pickup apparatus. By carrying out calculations on the basis of at least one of the formula (1), the formula (2), and the formula (3) in the control portion of the disc apparatus, there can be provided the disc apparatus capable of compensating for the IO characteristics of the pickup apparatus and the rolling suppression characteristics of the lens in the pickup apparatus.

The disc apparatus according to an embodiment of the present invention includes: a control portion configured to carry out calculations on the basis of at least one of the formula (1), the formula (2), and the formula (3); and a storage circuit configured to store the coefficients A11, A12, A13, A14, A21, A22, A23, A24, A31, A32, A33, and A34.

Thereby, there can be avoided IO defects for example of the pickup apparatus caused by an error in a manufacturing process of the pickup apparatus for example, and the occurrence of rolling of the lens in operation of the pickup apparatus. Calculations on the basis of at least one of the formula (1), the formula (2), and the formula (3) are carried out by the control portion of the disc apparatus using the required coefficients A11, A12, A13, A14, A21, A22, A23, A24, A31, A32, A33, and A34 among the coefficients A11, A12, A13, A14, A21, A22, A23, A24, A31, A32, A33, and A34 stored in the storage circuit, and thereby, there can be provided the disc apparatus capable of compensating for the IO characteristics of the pickup apparatus and the rolling suppression characteristics of the lens of the pickup apparatus.

First Embodiment

Figure 8:
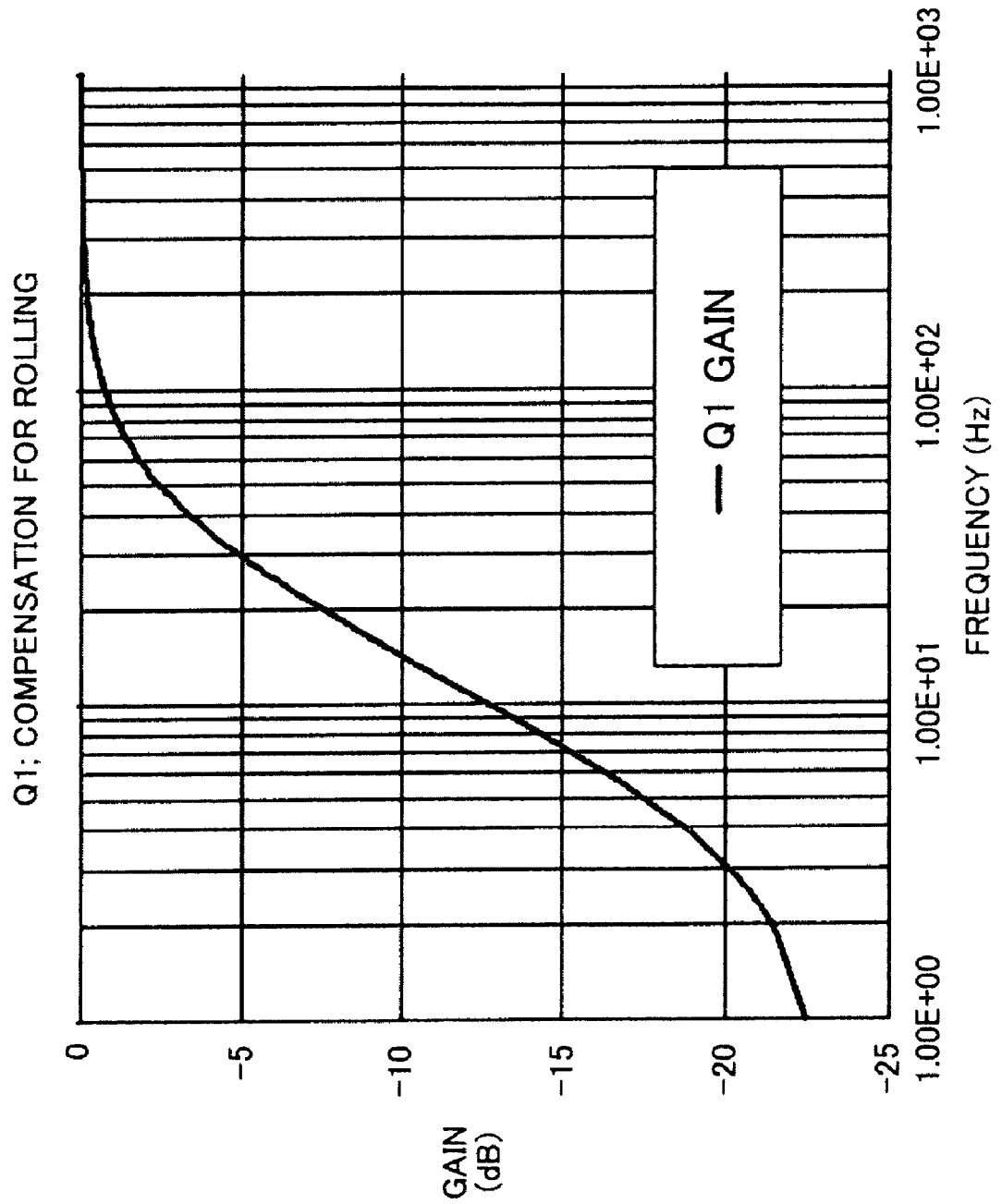
FIG. 8 is a waveform diagram illustrating a rolling frequency in a lens of the pickup apparatus.
Figure 9:
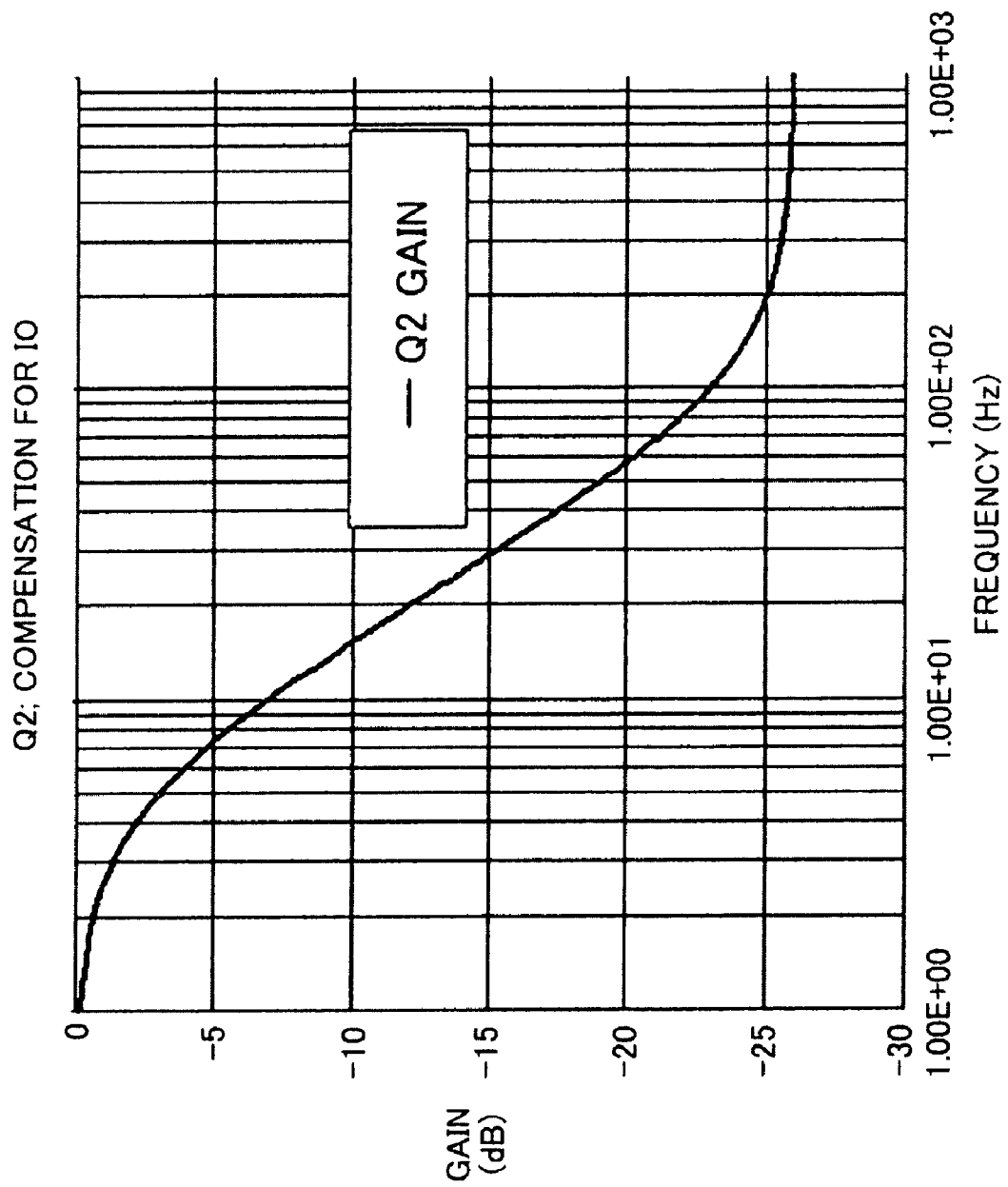
FIG. 9 is a waveform diagram illustrating a rolling frequency in the lens of the pickup apparatus.
Figure 10:
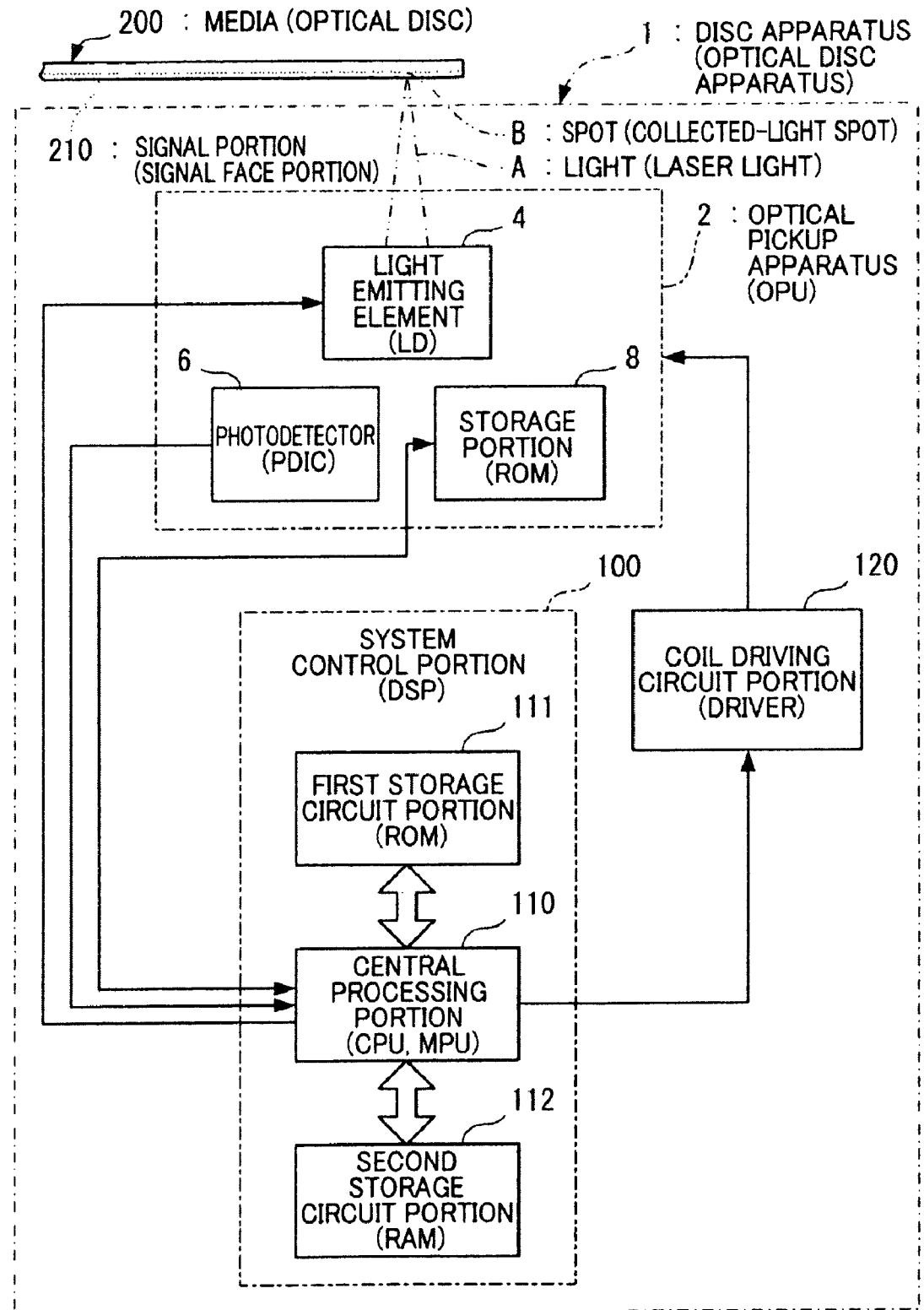
FIG. 10 is an explanatory diagram illustrating a disc apparatus according to a first embodiment of the present invention.
Figure 11:
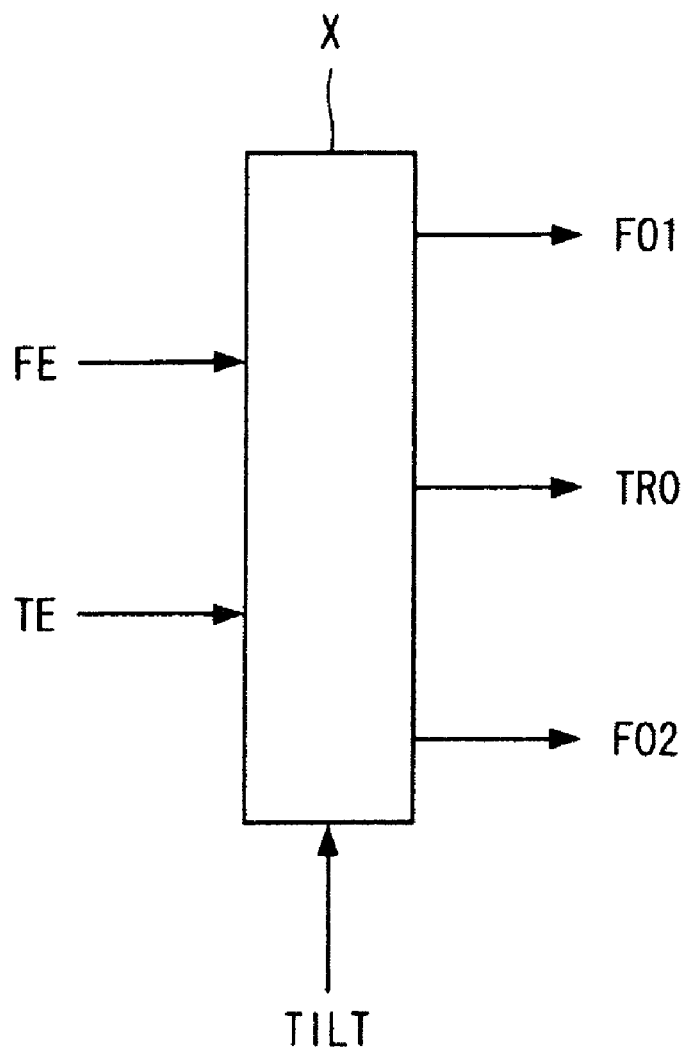
FIG. 11 is an explanatory diagram illustrating a calculation processing path when a driving signal is obtained by calculations.

FIGS. 1 to 9 are figures provided for convenience of easy-to-understand explanation of a first embodiment of the pickup apparatus according to the present invention. FIGS. 10 and 11 are figures provided for convenience of easy-to-understand explanation of the first embodiment of the disc apparatus according to the present invention.

Detailed explanations of each figure are as follows: FIGS. 1 to 7 are an explanatory side view of an actuator main body portion 70 of a pickup apparatus 2 taken from the side of a rotation center axis penetration portion 75 of the actuator main body portion 70 constituting an actuator 80 in the pickup apparatus 2; and FIGS. 1 to 7 are side a view of a state of the actuator main body portion 70 taken from the side substantially along an extension direction of linear support members 61, 62, 63, 64, 65, 66.

First, the optical pickup apparatus 2 and the control method thereof will be explained.

This optical pickup apparatus 2 (FIG. 1, FIG. 10) includes: a first objective lens 11 (FIG. 1) made of a synthetic resin or glass; and a second objective lens 12 made of a synthetic resin or glass, both configured to narrow laser light A to irradiate various sorts of media 200 such as a disc 200 (FIG. 10) with the laser light A. This optical pickup apparatus 2 includes a pair of objective lenses 11, 12.

The optical pickup apparatus 2 reproduces data, information, and signals recorded in the various sorts of media 200 such as various optical discs 200 (FIG. 10) and records data, information, and signals in the various sorts of media 200 such as the writable or rewritable various optical discs 200 and the like. The optical pickup apparatus 2 supports a "CD" (Compact Disc) (trademark) media, the "DVD" (registered trademark) (Digital Versatile Disc) media, the "HD DVD" (High Definition DVD) (registered trademark) media, and the "Blu-ray Disc" (registered trademark) media, for example. The optical pickup apparatus 2 supports at least one selected from a group consisting of the above various sorts of media 200 for example. More specifically, the optical pickup apparatus 2 supports any of the above plurality of pieces of media 200. The optical pickup or the optical pickup unit is abbreviated as "OPU" for example. Also, the media means a disc and the like in which data, information, signals, and the like are stored, for example. Also, the objective lens is abbreviated as "OBL".

Also, the OPU 2 (FIG. 1) includes a lens holder 20 made of a synthetic resin in a two-piece structure in substantially a rectangular box shape, the lens holder 20 having: a single top wall 21 which is substantially in a rectangular flat plate shape; and four side walls 22, 23, 24, 25 which are substantially orthogonal to the top wall 21 and are substantially in a rectangular flat plate shape, where the two OBLs 11, 12 are attached to the top wall 21 in substantially a rectangular flat plate shape. For example, the lens holder 20 in substantially a rectangular box shape is configured in such a manner that: a pair of the front and rear side walls 22, 25 in substantially a rectangular flat plate shape are opposed to each other substantially in parallel; a pair of the right and left side walls 23, 24 in substantially a rectangular flat plate shape are opposed to each other substantially in parallel; a pair of the right and left side walls 23, 24 are arranged substantially orthogonal to a pair of the front and rear side walls 22, 25; and the single top wall 21 in substantially a flat plate shape substantially orthogonal to each of the side walls 22, 23, 24, 25 is arranged on upper sides of the side walls 22, 23, 24, 25.

Also, the OPU 2 includes a first focus/tilt coil 31 in substantially a rectangular ring shape and a second focus/tilt coil 32 in substantially a rectangular ring shape which is arranged substantially side by side with respect to the first focus/tilt coil 31 in a substantially rectangular ring shape, where the coils 31 and 32 constitute the differential actuator 80 for driving the lens holder 20 having a plurality of the OBLs 11, 12, and where the coils 31 and 32 are attached to the right and left substantially end portions 26 and 27 respectively of the side wall 22, and the coils 31 and 32 are attached to the right and left substantially end portions 26 and 27 respectively of the side wall 25, which side walls 22, 25 both are substantially in a rectangular laterally oriented flat plate shape, and are opposed to each other in the lens holder 20 in substantially a rectangular box shape, and where the coils 31 and 32 are configured to drive the lens holder 20 having a plurality of the OBLs 11, 12 substantially along an optical axis direction Df of the OBL 11, 12 or drive the lens holder 20 substantially along an oscillation direction Dt.

Also, the OPU 2 includes the tracking coil 33 in substantially a rectangular ring shape, where the coil 33 constitutes the differential actuator 80 for driving the lens holder 20 having a plurality of the OBLs 11, 12, and where a pair of the coils 33 are attached to substantially center portions 28 of the front side wall 22 and the rear side wall 25 respectively, which side walls 22, 25 both are opposed to each other in the lens holder 20 in substantially a rectangular box shape, and where the coil 33 is arranged substantially side by side between the substantially rectangular ring shaped first focus/tilt coil 31 and the substantially rectangular ring shaped second focus/tilt coil 32, and where the coil 33 is configured to drive the lens holder 20 having a plurality of the OBLs 11, 12 substantially along a radial direction Dr of the optical disc.

Here, each direction will be described. The focus direction Df that is a direction substantially along the optical axis direction Df of the OBL 11, 12 is defined as a first direction for example. Also, the tracking direction Dr that is a direction substantially along the radial direction Dr of the optical disc is defined as a second direction for example. Also, the tilt direction Dt that is a direction substantially along the oscillation direction Dt of the lens holder 20 etc. provided with the OBL 11, 12 etc. is defined as a third direction for example. Also, a tangential direction Dc that is a direction orthogonal to the focus direction Df and the tracking direction Dr is defined as a fourth direction for example. The definition of each direction and the like in this description is a definition for convenience in explaining the optical disc apparatus 1 etc. including the OPU 2 corresponding to the various optical discs and the OPU 2 incorporating therein the various optical discs.

A material containing light metal such as an aluminum material or an aluminum alloy material is used to form a wire constituting the coils 31, 32, 33. Also, by using a copper-clad aluminum wire (CCAW: Copper Clad Aluminum Wire) for which weight reduction is easy, and by using a copper-clad aluminum wire with fusible enamel obtained by coating the CCAW with an insulating material such as an enamel material, there is constituted each of the driving coils 31, 32, 33. The CCAW with fusible enamel includes: an aluminum or an aluminum alloy material constituting a conductor main body portion; a copper material constituting an outer layer portion of the conductor main body portion; and an insulating material such as an enamel material constituting an outer circumference portion of the copper material and/or a fusible material (not shown). The coating formed by the insulating material is formed using a polyurethane resin, a B-type soldering enamel resin, a soldering polyester imide resin, and the like for example. The coating formed by the fusible material is formed using an alcohol adhesion resin, hot-air adhesion resin, and the like, for example. As the coil wire containing light metal such as an aluminum material or an aluminum alloy material and the like, there can be cited the enamel copper-clad aluminum wire by Totoku Electric Co., Ltd. for example.

Depending on the design/specification of the OPU 2, there may be used coils in other forms (not shown) instead of the coils 31, 32, 33, for example. For example, as the coil (31, 32, 33), there may be used a coil constituted by plating a circuit conductor on a substrate provided with a glass layer portion or a resin layer portion such as an epoxy resin layer. For example, a print coil of this type of coil may be used. The parentheses enclosing the reference numerals in this description are used for convenience in explaining those somewhat different from those illustrated and the like. By using the print coil (31, 32, 33), it becomes more easy to attach the coil (31, 32, 33) to the lens holder (20). By using the coil (31, 32, 33) constituted by plating the circuit conductor on the substrate, it becomes easier to carry out an attachment work of the coil (31, 32, 33) to the lens holder (20). Since the attachment work of the coil (31, 32, 33) to the lens holder (20) becomes easier to carry out, an assembling work of the OPU (2) becomes easy to carry out. Since the assembling work of the OPU (2) becomes easy to carry out, the price of the OPU (2) can be reduced. As the print coil, there can be cited FP coil (registered trademark) by Asahi Kasei Electronics Corporation for example.

Also, the OPU 2 includes the so-called substantially linear metal suspension wires 61, 62, 63, 64, 65, 66 that are six substantially linear support members 61, 62, 63, 64, 65, 66 made of metal, where the substantially linear metal suspension wires 61, 62, 63, 64, 65, 66 for supporting elastically the lens holder 20 are attached to the right and left side walls 23, 24 in substantially a rectangular flat plate shape opposed to each other in the lens holder 20 in substantially a rectangular box shape. When the lens holder 20 etc. is viewed from the side of the tilt rotation center axis penetration portion 75 of the lens holder 20 etc. constituting the OPU 2 for example, each of the substantially linear suspension wires 61, 62, 63, 64, 65, 66 is extended substantially along the tangential direction Dc such as the tilt rotation center axis extension direction Dc, which tangential direction is orthogonal to: the focus direction Df that is a direction substantially along the optical axis direction Df of the OBL 11, 12; and the tracking direction Dr that is a direction substantially along the radial direction Dr of the optical disc. Also, each of the substantially linear suspension wires 61, 62, 63, 64, 65, 66 is formed by using a conductor made of phosphor bronze, beryllium copper, for example.

By causing a driving signal, a control signal, and the like to pass through the right and left six suspension wires 61, 62, 63, 64, 65, 66 of the lens holder 20 of the OPU 2, the driving signal, the control signal, and the like pass through the front and rear six coils 31, 31, 32, 32, 33, 33 electrically connected to the suspension wires 61, 62, 63, 64, 65, 66 of the lens holder 20 of the OPU 2.

This OPU 2 comprises: the movable actuator main body portion 70 including a plurality of the OBLs 11, 12; the lens holder 20 having a plurality of pieces of structure; a plurality of the first focus/tilt coils 31; a plurality of the second focus/tilt coils 32; a plurality of the tracking coils 33; and a plurality of the suspension wires 61, 62, 63, 64, 65, 66.

When the movable actuator main body portion 70 is viewed from the side of the tilt rotation center axis penetration portion 75 of the movable actuator main body porting 70 constituting the actuator 80 of the OPU 2, the movable actuator main body portion 70 have a configuration of substantially a right and left symmetry and also of substantially a front and rear symmetry.

At substantially the center of the substantially rectangular laterally oriented flat plate shaped first side wall 22 of the lens holder 20 constituting the movable actuator main body portion 70, the front tracking coil 33 in substantially a rectangular ring shape is attached, and at the right and left sides of the front tracking coil 33, the front first focus/tilt coil 31 in substantially a rectangular ring shape and the front second focus/tilt coil 32 in substantially a rectangular ring shape are attached across the front tracking coil 33.

Also, at substantially the center of the substantially rectangular laterally oriented flat plate shaped second side wall 25 of the lens holder 20 constituting the movable actuator main body portion 70, the rear tracking coil 33 in substantially a rectangular ring shape is attached, and at the right and left sides of the rear tracking coil 33, the rear first focus/tilt coil 31 in substantially a rectangular ring shape and the rear second focus/tilt coil 32 in substantially a rectangular ring shape are attached across the rear tracking coil 33.

The front first focus/tilt coil 31, the front second focus/tilt coil 32, the rear first focus/tilt coil 31, and the rear second focus/tilt coil 32 are constituted substantially in the rectangular or square ring shape and substantially identical to one another in shape. Also, the front tracking coil 33 and the rear tracking coil 33 are constituted substantially in the rectangular and somewhat vertically oriented ring shape and substantially identical to each other in shape.

Assuming that the movable actuator main body portion 70 is viewed through from the side of the tilt rotation center axis penetration portion 75 of the movable actuator main body portion 70 constituting the actuator 80 of the OPU 2 for example, the front first focus/tilt coil 31 and the rear first focus/tilt coil 31 substantially overlap each other. Also, at that time, the front second focus/tilt coil 32 and the rear second focus/tilt coil 32 substantially overlap each other. Also, at that time, the front tracking coil 33 and the rear tracking coil 33 substantially overlap each other.

Also, in the vicinity of the left side wall 23 of the lens holder 20 constituting the movable actuator main body portion 70, one-side ends of three suspension wires 61, 62, 63 are attached, while in the vicinity of the right side wall 24 of the lens holder 20 constituting the movable actuator main body portion 70, the other-side ends of three suspension wires 64, 65, 66 are attached. The three one-side ends of the suspension wires 61, 62, 63 and the three other-side ends of the suspension wires 64, 65, 66 are arranged on the lens holder 20 substantially equally at right and left sides.

Also, on the top wall 21 of the lens holder 20 constituting the movable actuator main body portion 70, a pair of the OBLs 11, 12 are arranged substantially equally at the right and left sides. A pair of the OBLs 11, 12 are arranged substantially in the middle of the front first side wall 22 and the rear second side wall 25.

Since the movable actuator main body portion 70 constituting the actuator 80 in the OPU 2 is constituted in such a manner, there is constituted the movable actuator main body portion 70 of the actuator 80 in the OPU 2, which is excellent in stability and in balance. As a result, there is constituted the movable actuator main body portion 70 of the actuator 80 in the OPU 2 excellent in vibration suppression for example.

Also, the OPU 2 includes six magnetic members made of a magnet (not shown) constituting the actuator 80. Depending on a mounting structure of the magnet, the design/specification of the OPU 2 and the like, each magnet is formed using a permanent magnet material for example. The magnet is formed using a ferrite magnet that is inexpensive, and has a large coercive force, and is hardly demagnetized, for example. Also, depending on the mounting structure of the magnet, the design/specification of the OPU 2, and the like, the magnet used for the OPU 2 is an alloy for example obtained by adding to iron an alloy element such as chromium, aluminum, nickel, cobalt, and the like, for example; the alloy having permanent magnet characteristics with high coercive force and remaining magnetic flux density generated by mans of quenching hardening, deposition hardening, and the like; and the alloy moldable such by means of rolling machining. Also, there is used a driving magnet having two poles composed of: a positive pole portion formed on one side on the one face thereof; and a negative pole portion formed on the other side on one face thereof. Depending on the mounting structure of the magnet, the design/specification of the OPU 2, and the like, there may be used as the magnetic member for example a single-pole/bipolar magnet or a multipole magnetized magnet having two poles or more magnetized.

Also, such OPU 2 includes at least one so-called metal yoke (not shown), that is, a magnetic coupling member made of metal constituting the actuator 80. The "yoke" means those structurally supporting a magnetic coupling for example. Also, the "yoke" reduces leakage of a magnetic power generated from a magnetic member such as a magnet. The yoke is formed as a frame serving as a yoke, which is the so-called frame yoke. The "frame" means a frame, framework, and a skeleton, for example. The frame yoke is formed as a frame serving as a yoke.

This OPU 2 includes a fixed actuator main body portion (not shown) having a plurality of the magnets and the yoke.

In accordance with the first focus/tilt coil 31, the second focus/tilt coil 32, and the tracking coil 33 arranged side by side in substantially a right and left symmetrical manner, at least two magnetic members or preferably three magnetic members are arranged side by side in substantially a right and left symmetrical manner, for example. Also, in accordance with at least two magnetic members or preferably three magnetic members arranged side by side in substantially a right and left symmetrical manner, there is formed the yoke in substantially a right and left symmetrical manner.

Since the fixed actuator main body portion constituting the actuator 80 of the OPU 2 is constituted in such a manner, the movable actuator main body portion 70 of the actuator 80 in the OPU 2 is driven with a good stability and balance. Thereby, there is improved vibration suppression performance of the movable actuator main body portion 70 constituting the actuator 80 in the OPU 2, for example.

Also, the OPU 2 includes at least a single light emitting element 4 configured to irradiate the optical disc 200 (FIG. 10) with the laser light A, which is the so-called laser diode (LD: laser diode). For example, the LD4 is capable of emitting the blue violet laser light A for "HD DVD" and/or the "Blu-ray Disc" having a wavelength range from approximately 350 to 450 nm (nanometer) and a reference wavelength of approximately 405 nm, and having 0.2 to 500 mW (milliwatt). Also, for example, the LD4 is capable of emitting the red laser light A for the "DVD" having a wavelength range from approximately 630 to 685 nm and a reference wavelength of approximately 635 nm or 650 nm, and having 0.2 to 500 mW. Also, for example, the LD4 is capable of emitting the infrared laser light A for the "CD" having a wavelength range from approximately 765 to 830 nm and a reference wavelength of approximately 780 nm, and having 0.2 to 500 mW. This LD 4 is constituted as a special LD 4 capable of emitting the laser light A of a plurality of types of wavelengths, for example.

From the LD 4, the laser light A having the output value of 0.2 or more and 500 mW or less for example is emitted, and more specifically, the laser light A having the output value of 0.5 or more and 400 mW or less is emitted. If the laser light A has the output value of less than 0.2 mW for example, there is a shortage of the light amount of the laser light A reaching a photodetector 6 after having irradiated to and reflected from the optical disc 200. For reproducing each data and the like of the optical disc 200, the laser light A having the output value of several to several tens mW e.g. approximately 0.5 or more and 20 mW or less is considered to be sufficient. For writing each data and the like into the optical disc 200, the laser light A having the output value of several tens to several hundreds mW is considered to be necessary. For writing each data and the like into the optical disc 200 at a high speed for example, the pulse laser light A having a high output value such as 400 mW or 500 mW and the like may be needed.

Also, the OPU 2 includes at least one photodetector 6, which is the so-called PD (photodetector) or a PDIC (photo diode IC) 6, configured to receive the laser light A reflected from a signal portion 210 of the optical disc 200. The PDIC 6 comprises at least three light receiving portions composed of: a main light receiving portion (not shown) in substantially a rectangular shape on a plan view corresponding to a main light (0th light) transmitted through a diffraction grating (not shown) divided into a plurality of pieces such as a quadrant type etc. for example; and a pair of sub light receiving portions (not shown) in substantially a rectangular shape on a plan view corresponding to a pair of sub lights (±1st diffractive light flux) diffracted and branched after having transmitted the diffraction grating. The main light receiving portion in substantially a rectangular shape on a plan view is divided in substantially an equal manner into four segments each being in substantially a rectangular shape on a plan view. Also, the sub light receiving portion in substantially a rectangular shape on a plan view is divided in substantially an equal manner into four segments each being in substantially a rectangular shape on a plan view. As mentioned above, the OPU 2 is mounted with the PDIC 6 having plurally-divided type light receiving portions each having a plurality of segments each being in substantially a rectangular shape on a plan view.

The PDIC 6 is configured to receive the laser light A reflected from the signal face portion 210 of the optical disc 200, and convert the signal to an electric signal, to detect data, information, signals recorded in the signal face portion 210 of the optical disc 200. Also, the PDIC 6 is configured to receive the laser light A reflected from the signal face portion 210 of the optical disc 200, and convert the signal to an electric signal, to operate a servo mechanism (not shown) of the lens holder 20 provided with the OBL 11, 12 constituting the OPU 2. When data/information/signals recorded in the optical disc 200 are read out or data/information/signals are written into the optical disc 200 by means of the OPU 2, each laser light A is irradiated to each light receiving portion of the PDIC 6, and thereby, there are detected a main information signal and a focus error signal or a tracking error signal with respect to the optical disc 200.

As a focusing detection method of a collected-light spot B of the optical disc 200 in the OPU 2, there can be cited a detection method on the basis of a differential astigmatism and the like for example. The differential astigmatism method is a method of detecting displacement of the collected-light spot B by detecting a point image distortion formed by an optical system having the astigmatism for example. The focusing detection method of the collected-light spot B in the OPU 2 is a detection method on the basis of the differential astigmatism for example. As the focusing detection method, other detection methods such as a knife edge method may be used, for example.

Also, as the tracking detection method of the collected-light spot B of the optical disc 200 in the OPU 2, there can be cited a detection method on the basis of a differential push-pull (DPP: differential push-pull) and the like for example. The differential push-pull method is a method of detecting displacement of the collected-light spot B using a main light for data reading/writing and two sub lights for detecting a correction signal of displacement, for example. The tracking detection method of the collected-light spot B in the OPU 2 is a detection method on the basis of the differential push-pull method for example. As the tracking detection method, other detection methods such as a phase difference method may be used, for example.

The OPU 2 includes a storage portion 8 configured to store: programs for causing a calculation portion 110 of a control portion 100 in the optical disc apparatus 1 to carry out various controls; coefficients required for the OPU 2; optimal compensation parameters; and the like. Each function executed by software and the like is stored in the storage portion 8 accessible to the calculation portion 110 of the control portion 100 in the optical disc apparatus 1. The calculation portion 110 of the control portion 100 in the optical disc apparatus 1 is configured to carry out various controls/operations on the basis of the programs stored in the storage portion 8 such as a flash ROM. The "ROM" is an abbreviation of a "read-only memory". As the storage portion 8, a flash memory is used, for example. The storage portion 8 is constituted as a storage circuit, for example.

The storage portion 8 will be described in detail. As the storage portion 8, there can be cited a ROM such as an EEROM (Electrically Erasable ROM) for example. The ROM means a read-only memory. The EEROM is configured to store electrically erasable information. The EEROM is the so-called non-volatile memory without the need for a battery backup power source for example.

The storage portion 8 will be described specifically. As the storage portion 8, there can be cited the ROM such as the EEPROM (Electronically Erasable and Programmable Read Only Memory) for example. The EEPROM means a ROM whose contents are electrically rewritable. The EEPROM is the so-called non-volatile memory. When the EEPROM is to be changed, the change is carried out at a voltage higher than a usual voltage. Also, the EEPROM is configured to store electrically erasable information.

Also, as the storage portion 8, there can be cited the ROM such as an EPROM (Erasable Programmable Read Only Memory) for example. The EPROM means a ROM capable of erasing/writing of memory repeatedly. The EPROM is configured to erase memory in a special manner different from that in reading.

The OPU 2 (FIG. 1) including the movable actuator main body portion 70, the fixed actuator main body portion, the LD 4, the PDIC 6 (FIG. 10), and the EEROM 8, is constituted as the OPU 2 of a differential focus/tilt type capable of reading out a signal from the optical disc 200 and/or writing a signal into the optical disc 200.

Also, the optical disc apparatus 1 is capable of being equipped with any of the OPUs 2 shown in FIGS. 1 to 7 and the like for example.

Also, the optical disc apparatus 1 (FIG. 10) includes the control portion 100 configured to carry out calculations accurately and rapidly. For example, the system control portion 100 of the optical disc apparatus 1 constitutes a digital signal processor (DSP: digital signal processor) 100 capable of carrying out calculations accurately and rapidly. The DSP means a microprocessor specialized mainly in digital signal processing for example.

The system control portion 100 of the optical disc apparatus 1 constitutes a microcomputer for system control for example. The microcomputer for system control is a system controller, microprocessor, microcomputer, or the like, which means a central processing unit for example, and serves as a control portion for supervising the entire system control in the optical disc apparatus 1. Each function of the system control portion 100 is realized by the so-called program such as software, firmware, and the like.

The system control portion 100 of the optical disc apparatus 1 is equipped with a chip including a digital signal processing circuit portion constituting the DSP, for example. By using the DSP having the digital signal processing circuit portion, a high-speed calculation processing in the calculation portion 110 and the like can be carried out, for example. By using the DSP, a SN (signal/noise) ratio at approximately 90 dB (decibel) or more can be achieved when the signal processing is carried out, and the influence by the noise can be avoided more easily, and the influence by an ambient temperature and the like can be suppressed more easily. As mentioned above, by using the DSP in the system control portion 100 of the optical disc apparatus 1, a calculation processing with high accuracy and the like is carried out at a high speed.

Also, the optical disc apparatus 1 includes a central processing portion 110 configured to carry out calculations accurately and rapidly, which is the so-called CPU (central processing unit) 110. The central processing portion 110 may be also constituted as an MPU (micro processing unit), for example.

Also, the optical disc apparatus 1 includes a first storage circuit portion 111 storing a program for causing the CPU 110 of the DSP 100 to carry out various controls and the like. Each function executed by the software and the like is stored in the first storage circuit portion 111 accessible to the CPU 110 of the DSP 100. The CPU 110 of the DSP 100 is constituted to cause various controls/operations to be carried out on the basis of the program stored in the first storage circuit portion 111 such as a flash ROM. As the first storage circuit portion 111, there is used a flash memory for example. The first storage circuit portion 111 will be described in detail. As the first storage circuit portion 111, there can be cited a ROM such as EEROM for example. Also, as the first storage circuit portion 111, there can be cited a ROM such as EEPROM for example. Also, as the first storage circuit portion 111, there can be cited a ROM such as EPROM for example.

Also, the optical disc apparatus 1 includes a second storage circuit portion (storage circuit) 112 capable of storing/erasing various values such as coefficients, optimal compensation parameters, and the like to be input into the CPU 110 of the DSP 100, for example. As the second storage circuit portion 112, there is used a RAM (random access memory) for example. The RAM means a storage apparatus capable of accessing data within substantially the same time period irrespective of a storage location or order. By means of the CPU 110 of the DSP 100, the operation of the second storage circuit portion 112 such as RAM is controlled. The second storage circuit portion 112 is used when various sorts of signal data and the like are stored temporarily for the complicated calculations of signal data and the like at the CPU 110 of the DSP 100, for example.

The DSP 100 includes the CPU 110 and a plurality of the storage circuit portions 111, 112 that are the so-called ROM 111 and RAM 112.

Also, the optical disc apparatus 1 includes a coil driving circuit portion 120 (FIG. 10), which is the so-called driver 120, configured to receive a driving/control signal output from the CPU 110 of the DSP 100, and configured to supply a driving/control signal to each of the coils 31, 32, 33 (FIGS. 1 to 7) attached to the OPU 2.

Subsequently, there will be described the OPU 2 and the optical disc apparatus 1 capable of carrying out attitude control and the like of the movable actuator main body portion 70 of the differential actuator 80 using an algorithm, and their control methods. The algorithm means a calculation procedure or a processing procedure and the like, for example.

As mentioned above, the OPU 2 of the differential focus/tilt type includes at least a plurality of the coils 31, 32, 33 constituting the movable actuator main body portion 70 of the differential actuator 80.

Using the OPU 2 of the differential focus/tilt type constituted as above, the control method of the OPU 2 of carrying out the attitude control and the like of the movable actuator main body portion 70 of the differential actuator 80 constituting the OPU 2 is carried out as follows.

For example, after each driving signal is obtained by calculations using the algorithm, each driving signal is input into the OPU 2 of the differential focus/tilt type. Thereby, the occurrence of each of the above problems is avoided.

The driving signal to be sent to the differential actuator 80 of the OPU 2 is obtained by calculations using the algorithm. On the basis of the algorithm, the driving signal to be sent to the first focus/tilt coil 31 of the movable actuator main body portion 70 of the differential actuator 80 is obtained by calculations using the algorithm. Also, the driving signal to be sent to the second focus/tilt coil 32 of the movable actuator main body portion 70 of the differential actuator 80 is obtained by calculations on the basis of the algorithm. Also, the driving signal to be sent to the tracking coil 33 of the movable actuator main body portion 70 of the differential actuator 80 is obtained by calculations on the basis of the algorithm.

When each driving signal obtained by calculations using the algorithm is input into the OPU 2 of the differential focus/tilt type, there is avoided the occurrence of IO defects for example of the movable actuator main body portion 70 of the OPU 2 caused by an error in a manufacturing process in the individual differential actuator 80 constituting the OPU 2 of the differential focus/tilt type for example. Alternatively, in operation of the differential actuator 80 of the OPU 2, there is avoided the occurrence of rolling of the movable actuator main body portion 70 including a plurality of the coils 31, 32, 33. By adding the algorithm to a driving program X for driving the OPU 2 and by obtaining each driving signal by calculations using the algorithm, there is avoided the occurrence of each of the above problems.

The IO (incremental object) in this description means the static inclination generated for an object when a force is left exerted slowly on the object, for example. Also, the rolling in this description means a resonance state at a rolling natural frequency, for example.

The algorithm for driving the actuator 80 including the coils 31, 32, 33 and the like will be described in detail hereinafter. A transmission matrix, the so-called basic matrix, of distribution of general driving signals FO1, FO2, TR that are used when driving the actuator 80 of the OPU 2 of the differential focus/tilt type is driven, is determined as the following formula (A), which is a matrix equation for example:

$$\begin{bmatrix} FO1 \\ FO2 \\ TR \end{bmatrix} = \begin{bmatrix} A11 & A12 & A13 & A14 \\ A21 & A22 & A23 & A24 \\ A31 & A32 & A33 & A34 \end{bmatrix} \begin{bmatrix} FE \\ TILT \\ TE \\ TE^2 \end{bmatrix} \quad (A)$$

where FO1 represents a driving signal to be input into a first focus/tilt coil; FO2 represents a driving signal to be input into a second focus/tilt coil; TR represents a driving signal to be input into a tracking coil; A11, A12, A13, A14, A21, A22, A23, A24, A31, A32, A33, and A34 represent coefficients having arbitrary values; FE represents a focus error signal; TE represents a tracking error signal; and TILT represents a correction tilt amount signal.

On the basis of the above formula (A), the driving signal FO1 to be sent to the first focus/tilt coil 31 of the movable actuator main body portion 70 of the differential actuator 80 is obtained by calculations. Also on the basis of the above formula (A), the driving signal FO2 to be sent to the second focus/tilt coil 32 of the movable actuator main body portion 70 of the differential actuator 80 is obtained by calculations. Also, on the basis of the above formula (A), the driving signal TR to be sent to the tracking coil 33 of the movable actuator main body portion 70 of the differential actuator 80 is obtained by calculations.

By means of calculations on the basis of the above formula (A), there are avoided IO defects of the movable actuator main body portion 70 of the OPU 2 and the occurrence of rolling in the movable actuator main body portion 70 in the OPU 2. By using the compensation algorithm on the basis of the above formula (A) in the driving program X for driving the OPU 2 in order to optimally distribute the driving force in the three directions that are the focus direction Df, the tracking direction Dr, the tilt direction Dt, there is obtained each of the driving signals FO1, FO2, TR to be sent to the differential actuator 80 of the OPU 2. Since the driving signal FO1 to be sent to the first focus/tilt coil 31 of the movable actuator main body portion 70 in the differential actuator 80, the driving signal FO2 to be sent to the second focus/tilt coil 32, and the driving signal TR to be sent to the tracking coil 33 are obtained by calculations on the basis of the above formula (A), there is avoided the occurrence of each of the above problems.

The optical disc apparatus 1 includes any of the OPUs 2 shown in FIGS. 1 to 7 and the like for example, the CPU 110 (FIG. 10), the ROM 111, and the RAM 112, and further includes the DSP 100 configured to carry out calculations on the basis of the above formula (A) accurately and rapidly and the driver 120.

Using the optical disc apparatus 1 constituted as above, there is carried out, on the basis of the above formula (A), the control method of the optical disc apparatus 1 by which the attitude control and the like of the movable actuator main body portion 70 of the differential actuator 80 (FIGS. 1 to 7) constituting the OPU 2 is carried out.

For example, the focus error signal FE, the tracking error signal TE, and the correction tilt amount signal TILT are input into the software X (FIG. 11), and calculations on the basis of the above formula (A) are carried out by the software X, and thereby, each of the driving signals FO1, FO2, TR is output.

The optical disc apparatus 1 includes the DSP 100 configured to carry out calculations on the basis of the above formula (A) accurately and rapidly, and the control method of the optical disc apparatus 1 of carrying out a calculation processing of the formula (A) in accordance with the software X is carried out, and thereby, there is avoided the occurrence of IO defects for example of the movable actuator main body portion 70 of the OPU 2 caused by an error in a manufacturing process in the individual differential actuator 80 constituting the OPU 2 of the differential focus/tilt type for example.

Alternatively, in operation of the differential actuator 80 of the OPU 2, there is avoided the occurrence of rolling in the movable actuator main body portion 70 including the OBL 11, 12 and each coil 31, 32, 33 such as the first focus/tilt coil 31, the second focus/tilt coil 32, the tracking coil 33, and the like. By adding the compensation algorithm on the basis of the above formula (A) to the driving program X for driving the OPU 2, and by carrying out calculations of each of the driving signals FO1, FO2, TR using the compensation algorithm, there can be provided the optical disc apparatus 1 and the control method thereof capable of avoiding the occurrence of each of the above problems.

Calculations on the basis of the above formula (A) are carried out by the DSP 100 of the optical disc apparatus 1 accurately and rapidly. Thereby, there can be provided the optical disc apparatus 1 having the IO characteristics and the rolling suppression characteristics compensated, and the control method thereof, where the IO characteristics are those of the movable actuator main body portion 70 of the OPU 2, and the rolling suppression characteristics are those of the movable actuator main body portion 70 of the OPU 2.

Subsequently, the optical pickup apparatus 2 and the control method thereof will be described more specifically.

FIG. 1 is an explanatory diagram illustrating the movable actuator main body portion 70 of the actuator 80 in the OPU 2 in a side view of the movable actuator main body portion 70 taken from the side of the tilt rotation center axis penetration portion 75 of the movable actuator main body portion 70 constituting the OPU 2, where the movable actuator main body portion 70 of the actuator 80 in the OPU 2 has a plurality of magnetic members (not shown) arranged side by side corresponding to a plurality of the coils 31, 32, 33 arranged side by side, which are the first focus/tilt coil 31, the second focus/tilt coil 32, and the tracking coil 33.

For example, this OPU 2 (FIG. 1) includes: the first OBL 11 (FIG. 1) and the second OBL 12 for narrowing the laser light A and irradiating various optical discs 200 (FIG. 10) with the laser light A; the first focus/tilt coil 31 and the second focus/tilt coil 32 for driving the lens holder 20 having a plurality of the OBLs 11, 12 substantially along the optical axis direction Df of the OBL 11, 12 or substantially along the oscillation direction Dt; and the tracking coil 33 (FIG. 1) for driving the lens holder 20 having a plurality of the OBLs 11, 12 substantially along the radial direction Dr of the optical disc 200 (FIG. 10), and is constituted as the OPU 2 of the differential focus/tilt type capable of reading out a signal from the optical disc 200 (FIG. 10) and/or writing a signal into the optical disc 200.

Using the OPU 2 of the differential focus/tilt type constituted as above, the control method of the OPU 2 (FIGS. 1 and 10) of carrying out the attitude control and the like of the movable actuator main body portion 70 of the differential actuator 80 (FIG. 1) constituting the OPU 2 is carried out as follows.

First, the driving signal to be input into the first focus/tilt coil 31 is defined as FO1. Also, the driving signal to be input into the second focus/tilt coil 32 is defined as FO2. Also, the driving signal to be input into the tracking coil 33 is defined as TR. Also, the focus error signal detected by the photodetector 6 such as the PDIC 6 etc. when out-of-focus of the laser light A substantially along the optical axis direction Df of the OBL 11, 12 with respect to the signal face portion 210 of the optical disc 200 occurs, is defined as FE. Also, the tracking error signal detected by the photodetector 6 such as the PDIC 6 etc. when out-of-focus of the laser light A substantially along the radial direction Dr of the optical disc 200 with respect to the signal face portion 210 of the optical disc 200 occurs, is defined as TE. Also, the correction tilt amount signal for correcting the angle misalignment of the OBL 11, 12 when a focus angle misalignment of the laser light A with respect to the signal face portion 210 of the optical disc 200 occurs, is defined as TILT.

Each signal is defined as above, and then each of the driving signals FO1, FO2, TR for operating the differential actuator 80 will be described. The driving signal FO1 to be input into the first focus/tilt coil 31 is determined on the basis of the following formula (1). Also, the driving signal FO2 to be input into the second focus/tilt coil 32 is determined on the basis of the following formula (2). Also, the driving signal TR to be input into the tracking coil 33 is determined on the basis of the following formula (3).

$$FO1=(A11 \times FE)+(A12 \times TILT)+(A13 \times TE)+(A14 \times TE^2) \quad (1)$$

$$FO2=(A21 \times FE)+(A22 \times TILT)+(A23 \times TE)+(A24 \times TE^2) \quad (2)$$

$$TR=(A31 \times FE)+(A32 \times TILT)+(A33 \times TE)+(A34 \times TE^2) \quad (3)$$

where, the coefficients A11, A12, A13, A14, A21, A22, A23, A24, A31, A32, A33, and A34 in each formula have arbitrary values.

By inputting the driving signals FO1, FO2, TR determined respectively on the basis of the above formulas (1), (2), and (3) into the OPU 2 of the differential focus/tilt type, there is avoided the occurrence of IO defects for example of the movable actuator main body portion 70 of the OPU 2 caused by an error in a manufacturing process in the individual differential actuator 80 constituting the OPU 2 of the differential focus/tilt type for example. Alternatively, there is avoided the occurrence of rolling of the movable actuator main body portion 70 provided with the OBL 11, 12 in operation of the differential actuator 80 of the OPU 2. Even if there is a "variation" in performance and the like of the individual differential actuators 80 in the mass-production of the OPU 2, non-conformity occurring in the OPU 2 is solved by carrying out the actuator control method of the OPU 2, for example.

For example, a distribution formula of the usual driving signals FO1, FO2, TR will be described. Each of the coefficients A13 and A14 in the above formula (A) or the above formula (1) of the usual OPU 2 is set at zero "0". Also, the driving signal FO1 in the above formula (1) at that time is determined on the basis of the following formula (4) for example.

$$FO1=(+0.5 \times FE)+(+0.5 \times TILT)+(0 \times TE)+(0 \times TE^2) \quad (4)$$

Also, each of the coefficients A23 and A24 in the above formula (A) or the above formula (2) of the usual OPU 2 is set at zero "0". Also, the driving signal FO2 in the above formula (2) at that time is determined on the basis of the following formula (5) for example.

$$FO2=(+0.5 \times FE)+(-0.5 \times TILT)+(0 \times TE)+(0 \times TE^2) \quad (5)$$

Also, each of the coefficients A31, A32, and A34 in the above formula (A) or the above formula (3) of the usual OPU 2 is set at zero "0". Also, the driving signal TR in the above formula (3) at that time is determined on the basis of the following formula (6) for example.

$$TR=(0 \times FE)+(0 \times TILT)+(+1 \times TE)+(0 \times TE^2) \quad (6)$$

For example, when a side view of the movable actuator main body portion 70 is taken from the side of the tilt rotation center axis penetration portion 75 of the movable actuator main body portion 70 of the OPU 2, it is preferable that a focus/tilt application point portion 71 that is a resultant force point portion 71 of an electromagnetic force exerted on the first focus/tilt coil 31 and the second focus/tilt coil 32, a tracking application point portion 72 that is a center portion 72 of an electromagnetic force exerted on the tracking coil 33, a center of gravity portion 73 of the movable actuator main body portion 70, and a rotation center portion 74 that is a center portion 74 when the movable actuator main body portion 70 is tilted and rotated, are all substantially matched.

However, it has been considered to be difficult to match with accuracy all the focus/tilt application point portion 71, the tracking application point portion 72, the center of gravity portion 73, and the rotation center portion 74 in the movable actuator main body portion 70 of the OPU 2, in a side view of the movable actuator main body portion 70 taken from the side of the tilt rotation center axis penetration portion 75 of the movable actuator main body portion 70 of the OPU 2, because such matching is dependent on the design/specification of the OPU 2, accuracy of each of the components constituting the OPU 2, assembling accuracy of the OPU 2, and the like.

Even in the OPU 2 in such a case, in order to prevent the occurrence of IO defects or rolling in the movable actuator main body portion 70 of the OPU 2 in the optical disc apparatus 1, a partial change is applied to the distribution formula of the usual driving signals FO1, FO2, TR corresponding to the triaxial directions composed of: the focus direction Df that is a direction substantially along the optical axis direction Df of the OBL 11, 12; the tracking direction Dr that is a direction substantially along the radial direction Dr of the optical disc; and the tilt direction Dt that is a direction substantially along the oscillation direction Dt of the OBL 11, 12. For example, a part of the distribution formula is temporarily changed as necessary.

Thereby, even if there occur IO defects for example caused by various errors and the like in a manufacturing process in the movable actuator main body portion 70 of the OPU 2, the OPU 2 is not handled as defective but handled as a usable product. As a result, a drop in yield of the OPU 2 is avoided. Since the drop in yield of the OPU 2 is avoided, price down of the OPU 2 for example is promoted. Also, since the drop in yield of the OPU 2 is avoided, price down of the optical disc apparatus 1 is promoted.

Also, in operation of the differential actuator 80 of the OPU 2, there is avoided the occurrence of rolling of the movable actuator main body portion 70 including the OBL 11, 12, the coils 31, 32, 33, and the like. There can therefore be provided the OPU 2 having improved operation characteristics, and the control method thereof. Also, since the operating characteristics of the OPU 2 is improved, there can be provided the optical disc apparatus 1 having improved operating characteristics, and the control method thereof.

For convenience, by a circle in a chain double-dashed line, there are indicated the focus/tilt application point portion 71, the tracking application point portion 72, the center of gravity portion 73, the rotation center portion 74, and the tilt rotation center axis penetration portion 75 in the movable actuator main body portion 70 of the OPU 2 viewed from the side. Also, for convenience, by an arrow in a chain double-dashed line, there is indicated a force exerted on each of the coils 31, 32, 33 for driving the movable actuator main body portion 70 of the OPU 2 and stabilizing the attitude of the movable actuator main body portion 70.

Figure 2:
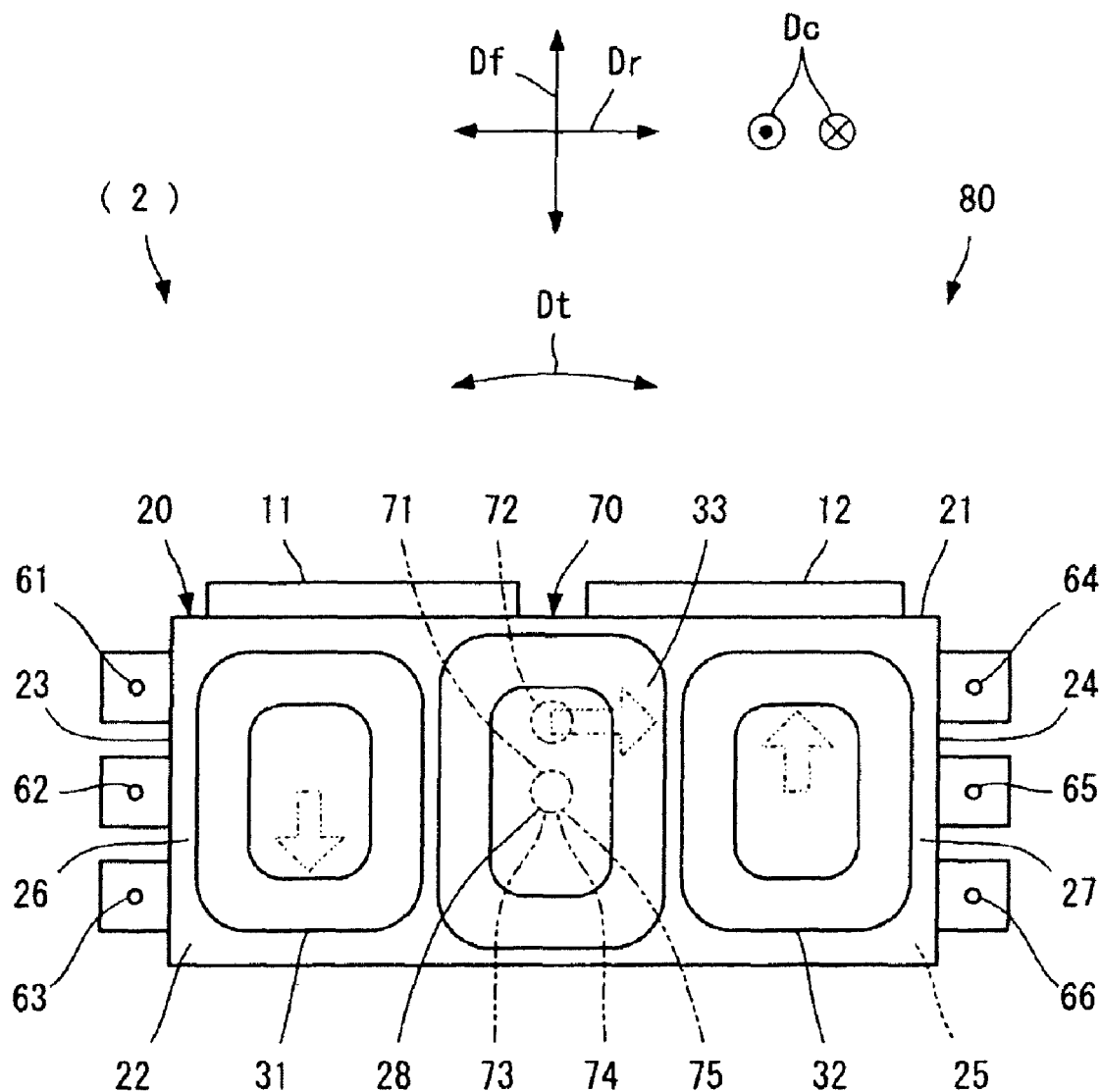
FIG. 2 is a side view illustrating the pickup apparatus according to an embodiment of the present invention.
Figure 3:
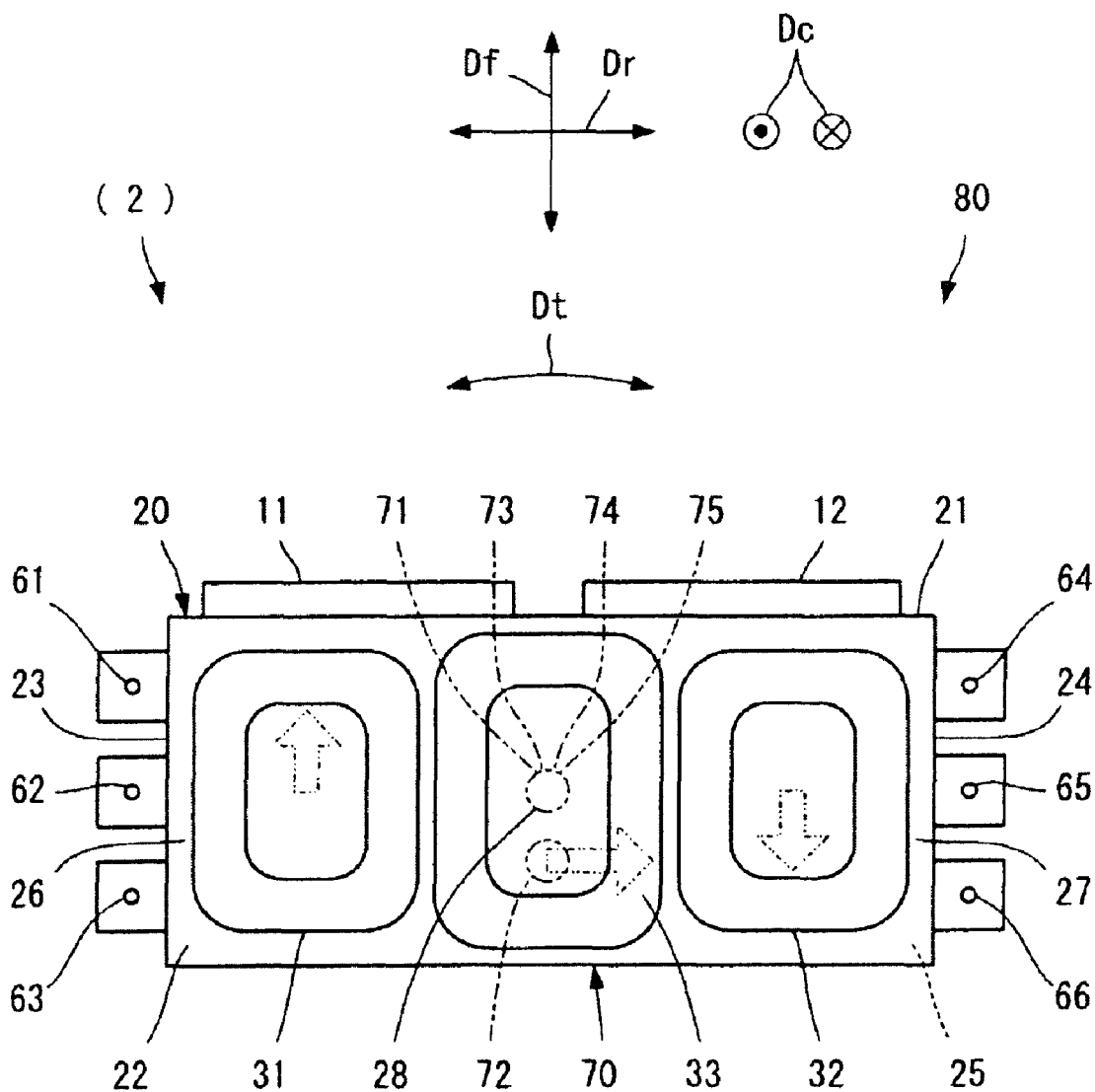
FIG. 3 is a side view illustrating the pickup apparatus according to an embodiment of the present invention.

FIG. 2 is an explanatory diagram illustrating a state where the tracking application point portion 72, which is the center portion 72 of an electromagnetic force exerted on the tracking coil 33 of the movable actuator main body portion 70, is positioned above the center of gravity portion 73 of the movable actuator main body portion 70, in a side view of the movable actuator main body portion 70 taken from the side of the tilt rotation center axis penetration portion 75 of the movable actuator main body portion 70 constituting the OPU 2. FIG. 3 is an explanatory diagram illustrating a state where the tracking application point portion 72, which is the center portion 72 of an electromagnetic force exerted on the tracking coil 33 of the movable actuator main body portion 70, is positioned below the center of gravity portion 73 of the movable actuator main body portion 70, in a side view of the movable actuator main body portion 70 taken from the side of the tilt rotation center axis penetration portion 75 of the movable actuator main body portion 70 constituting the OPU 2. Although the center of gravity portion 73 of the movable actuator main body portion 70 and the tracking application point portion 72 are so indicated as to be away from each other for convenience, an actual distance between the center of gravity portion 73 of the movable actuator main body portion 70 and the tracking application point portion 72 is short.

By attaching the first OBL 11, the second OBL 12, the first focus/tilt coil 31, the second focus/tilt coil 32, the tracking coil 33, and the six suspension wires 61, 62, 63, 64, 65, 66 to the lens holder 20, there is constituted the movable actuator main body portion 70, for example.

For example, when the movable actuator main body portion 70 provided with the OBL 11, 12 is driven substantially along the tracking direction Dr that is a direction substantially along the radial direction Dr of the optical disc; in the case where the rotation center portion 74 that is the center portion 74 when the movable actuator main body portion 70 is tilted and rotated, the focus/tilt application point portion 71 that is the resultant force point portion 71 of an electromagnetic force exerted on the first focus/tilt coil 31 and the second focus/tilt coil 32 and the center of gravity portion 73 of the movable actuator main body portion 70 are substantially matched, and in the case where the center of gravity portion 73 of the movable actuator main body portion 70 and the tracking application point portion 72 that is the center portion 72 of an electromagnetic force exerted on the tracking coil 33 are not matched, in a side view of the movable actuator main body portion 70 taken from the side of the tilt rotation center axis penetration portion 75 of the movable actuator main body portion 70; zero "0" is input into each of the coefficients A14, A24, A31, A32, and A34 of the above formula (A), the formula (1), the formula (2), and the formula (3); arbitrary numeral values other than zero are input into the coefficients A11, A12, A21, A22, and A33; and arbitrary numerical values other than zero are input into the coefficients A13 and A23, where the coefficients A13 and A23 are opposite to each other in sign, and are substantially the same in absolute value.

As a result, when the movable actuator main body portion 70 provided with the OBL 11, 12 of the OPU 2 is driven substantially along the tracking direction Dr that is a direction substantially along the radial direction Dr of the optical disc, for example, there is avoided the occurrence of rolling in the movable actuator main body portion 70 provided with the OBL 11, 12 of the OPU 2.

More specifically, in the case where the rotation center portion 74 that is the center portion 74 when the movable actuator main body portion 70 is tilted and rotated, the focus/tilt application point portion 71 that is the resultant force point portion 71 of an electromagnetic force exerted on the first focus/tilt coil 31 and the second focus/tilt coil 32, and the center of gravity portion 73 of the movable actuator main body portion 70 are substantially matched, and in the case where the center of gravity portion 73 of the movable actuator main body portion 70 and the tracking application point portion 72 that is the center portion 72 of an electromagnetic force exerted on the tracking coil 33 are not matched, in a side view of the movable actuator main body portion 70 taken from the side of the tilt rotation center axis penetration portion 75 of the movable actuator main body portion 70; if rolling is to occur in the movable actuator main body portion 70 provided with the OBL 11, 12 of the OPU 2 because of the displacement of the tracking application point portion 72 with respect to the center portion 73 of the movable actuator main body portion 70 in the vertical direction i.e. along the optical axis direction Df of the OBL 11, 12, when the movable actuator main body portion 70 provided with the OBL 11, 12 of the OPU 2 is driven substantially along the tracking direction Dr; an arbitrary numerical value other than zero is input into the coefficient A13 in the formula (A) or the formula (1); an arbitrary numerical value other than zero is input into the coefficient A23 in the formula (A) or the formula (2); the coefficient A23 is given a numerical value opposite in sign to a numerical value given to the coefficient A13 at that time, and the absolute values of the coefficients A13 and A23 are rendered as being substantially the same in positive and negative at that time; and thereby, the corrected driving signal FO1 is input into the first focus/tilt coil 31 and the corrected driving signal FO2 is input into the second focus/tilt coil 32, and thereby, there is avoided the occurrence of rolling in the movable actuator main body portion 70 provided with the OBL 11, 12.

That will be explained using a specific example. The driving signal FO1 at that time is determined on the basis of the following formula (7), for example:

$$FO1 = (+0.5 \times FE) + (+0.5 \times TILT) + (-0.1 \times TE) + (0 \times TE^2) \qquad (7)$$

Also, the driving signal FO2 at that time is determined on the basis of the following formula (8), for example:

$$FO2 = (+0.5 \times FE) + (-0.5 \times TILT) + (+0.1 \times TE) + (0 \times TE^2) \qquad (8)$$

Also, the driving signal TR at that time is determined on the basis of the following formula (9), for example:

$$TR = (0 \times FE) + (0 \times TILT) + (+1 \times TE) + (0 \times TE^2) \qquad (9)$$

In the formula (A) or the formula (7), the coefficient A13 to be multiplied by the tracking error signal TE in order to obtain the driving signal FO1 is −0.1 for example, but this numerical value of the coefficient A13 is a value for reference. Also, in the formula (A) or the formula (8), the coefficient A23 to be multiplied by the tracking error signal TE in order to obtain the driving signal FO2 is +0.1 for example, but this numerical value of the coefficient A23 is a value for reference. Depending on the design/specification etc. of the OPU 2 etc., the numerical value to be input into each coefficient such as the coefficients A13, A23 etc. and the relation of positive or negative of each coefficient such as the coefficients A13, A23 etc. are changed as appropriate.

Figure 4:
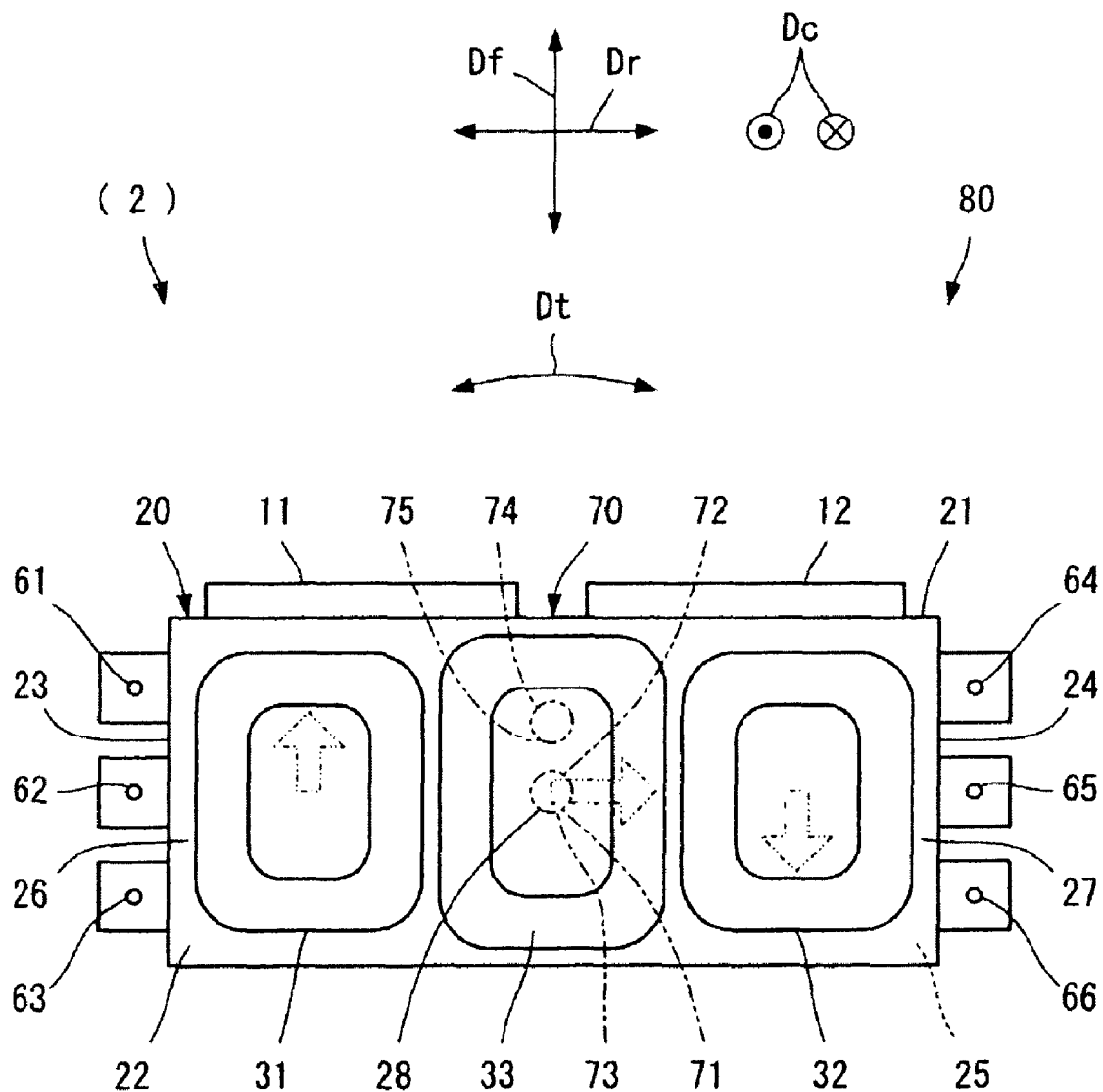
FIG. 4 is a side view illustrating the pickup apparatus according to an embodiment of the present invention.

FIG. 4 is an explanatory diagram illustrating a state where the rotation center portion 74, which is the center portion 74 when the movable actuator main body portion 70 is tilted and rotated, is positioned above the tracking application point portion 72 that is the center portion 72 of an electromagnetic force exerted on the tracking coil 33, in a side view of the movable actuator main body portion 70 taken from the side of the tilt rotation center axis penetration portion 75 of the movable actuator main body portion 70 constituting the OPU 2. Although the rotation center portion 74 of the movable actuator main body portion 70 and the tracking application point portion 72 are so indicated as to be away from each other for convenience, but actually, an actual distance between the rotation center portion 74 of the movable actuator main body portion 70 and the tracking application point portion 72 is short.

For example, when the movable actuator main body portion 70 provided with the OBL 11, 12 is driven substantially along the tracking direction Dr that is a direction substantially along the radial direction Dr of the optical disc; in the case where the center of gravity portion 73 of the movable actuator main body portion 70, the focus/tilt application point portion 71 that is the resultant force point portion 71 of an electromagnetic force exerted on the first focus/tilt coil 31 and the second focus/tilt coil 32, and the tracking application point portion 72 that is the center portion 72 of an electromagnetic force exerted on the tracking coil 33 are substantially matched, and in the case where the tracking application point portion 72 and the rotation center portion 74 that is the center portion 74 when the movable actuator main body portion 70 is tilted and rotated are not matched, in a side view of the movable actuator main body portion 70 taken from the side of the tilt rotation center axis penetration portion 75 of the movable actuator main body portion 70; zero "0" is input into each of the coefficients A14, A24, A31, A32, and A34 of the above formula (A), the formula (1), the formula (2), and the formula (3); arbitrary numerical values other than zero are input into the coefficients A11, A12, A21, A22, and A33; and arbitrary numerical values other than zero are input into the coefficients A13 and A23, where the coefficients A13 and A23 are opposite to each other in sign, and are substantially the same in absolute value.

As a result, the IO characteristics of the movable actuator main body portion 70 of the OPU 2 are improved.

More specifically, in the case where the center of gravity portion 73 of the movable actuator main body portion 70, the focus/tilt application point portion 71 that is the resultant force point portion 71 of an electromagnetic force exerted on the first focus/tilt coil 31 and the second focus/tilt coil 32, and the tracking application point portion 72 that is the center portion 72 of an electromagnetic force exerted on the tracking coil 33 are substantially matched, and in the case where the tracking application point portion 72 and the rotation center portion 74 that is the center portion 74 when the movable actuator main body portion 70 is tilted and rotated are not matched, in a side view of the movable actuator main body portion 70 taken from the side of the tilt rotation center axis penetration portion 75 of the movable actuator main body portion 70; if the IO characteristics of the movable actuator main body portion 70 of the OPU 2 are poor because of the displacement of the rotation center portion 74 of the movable actuator main body portion 70 with respect to the tracking application point portion 72 in the vertical direction i.e. along the optical axis direction Df of the OBL 11, 12, when the movable actuator main body portion 70 provided with the OBL 11, 12 of the OPU 2 is driven substantially along the tracking direction Dr; an arbitrary numerical value other than zero is input into the coefficient A13 in the formula (A) or the formula (1); an arbitrary numerical value other than zero is input into the coefficient A23 in the formula (A) or the formula (2); the coefficient A23 is given a numerical value opposite in sign to a numerical value given to the coefficient A13 at that time; and the absolute values of the coefficients A13 and A23 are rendered as being substantially the same in positive and negative at that time; and thereby, the corrected driving signal FO1 is input into the first focus/tilt coil 31 and the corrected driving signal FO2 is input into the second focus/tilt coil 32; and thereby, a difference is provided between the driving signal FO1 input into the first focus/tilt coil 31 and the driving signal FO2 input into the second focus/tilt coil 32; and thereby, there are improved the IO characteristics of the movable actuator main body portion 70 of the OPU 2.

That will be explained using a specific example. The driving signal FO1 at that time is determined on the basis of the following formula (10), for example:

$$FO1 = (+0.5 \times FE) + (+0.5 \times TILT) + (+0.1 \times TE) + (0 \times TE^2) \quad (10)$$

Also, the driving signal FO2 at that time is determined on the basis of the following formula (11), for example:

$$FO2 = (+0.5 \times FE) + (-0.5 \times TILT) + (-0.1 \times TE) + (0 \times TE^2) \quad (11)$$

Also, the driving signal TR at that time is determined on the basis of the following formula (12), for example:

$$TR = (0 \times FE) + (0 \times TILT) + (+1 \times TE) + (0 \times TE^2) \quad (12)$$

Figure 5:
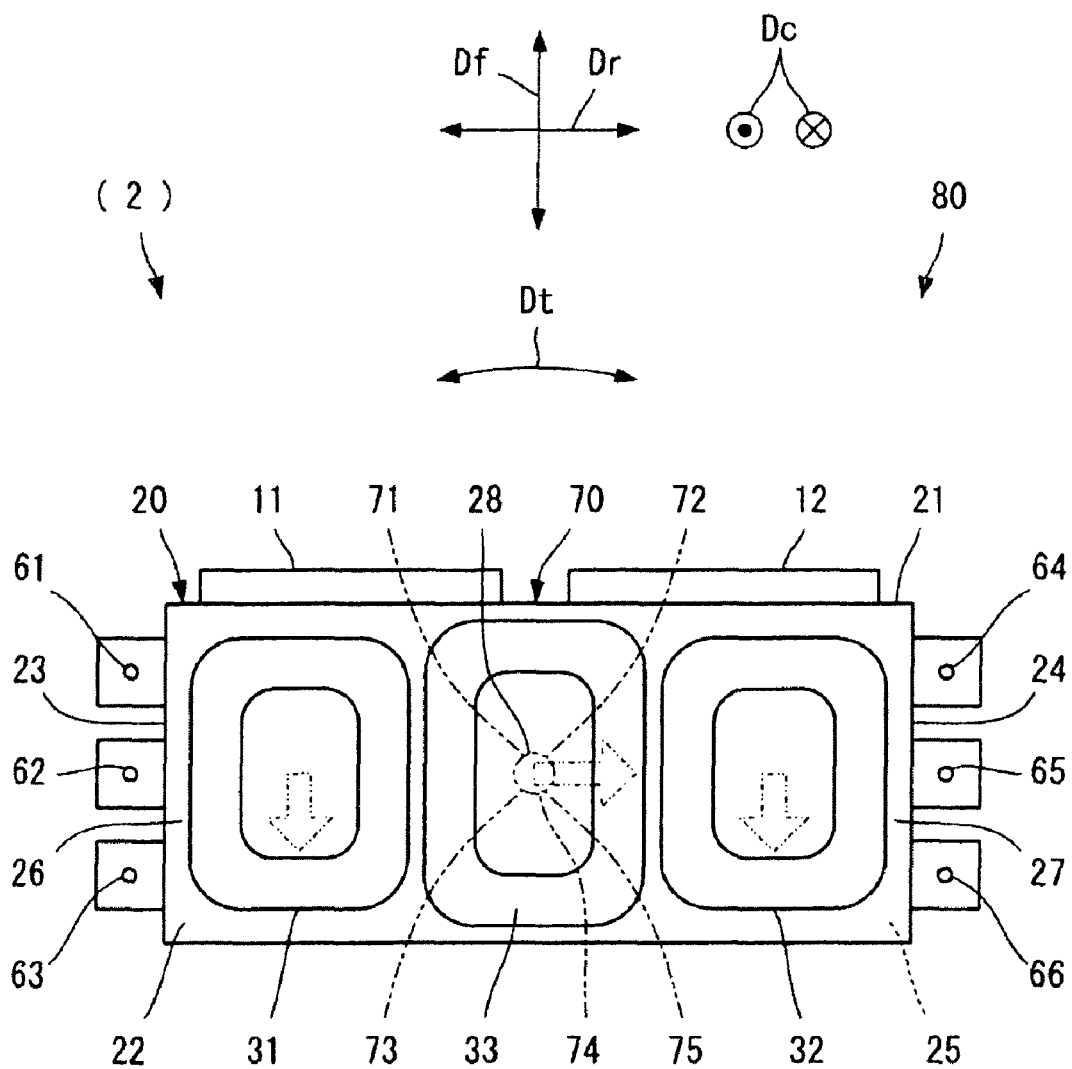
FIG. 5 is a side view illustrating the pickup apparatus according to an embodiment of the present invention.

FIG. 5 is an explanatory diagram illustrating the movable actuator main body portion 70 of the actuator 80 of the OPU 2 having the three-pole magnetic members arranged side by side corresponding to the three coils that are the first focus/tilt coil 31, the second focus/tilt coil 32, and the tracking coil 33 arranged side by side, in a side view of the movable actuator main body portion 70 taken from the side of the tilt rotation center axis penetration portion 75 of the movable actuator main body portion 70 constituting the OPU 2.

For example, in the actuator 80 of the OPU 2 having the first focus/tilt coil 31 and the second focus/tilt coil 32 arranged respectively at the end portions 26 and 27 of each of the side walls 22, 25 opposed to each other in the lens holder 20 in substantially a rectangular box shape, and having the tracking coil 33 arranged between the first focus/tilt coil 31 and the second focus/tilt coil 32, and having the three-pole magnets (not shown) arranged side by side corresponding to the three coils 31, 32, 33 that are the first focus/tilt coil 31, the second focus/tilt coil 32, and the tracking coil 33 arranged side by side; the case will be described hereinafter, where the focus/tilt application point portion 71 that is the resultant force point portion 71 of an electromagnetic force exerted on the first focus/tilt coil 31 and the second focus/tilt coil 32, the tracking application point portion 72 that is the center portion 72 of an electromagnetic force exerted on the tracking coil 33, the rotation center portion 74 that is the center portion 74 when the movable actuator main body portion 70 is tilted and rotated, and the center of gravity portion 73 of the movable actuator main body portion 70 are substantially matched, in a side view of the movable actuator main body portion 70 taken from the side of the tilt rotation center axis penetration portion 75 of the movable actuator main body portion 70.

In such a case, when the movable actuator main body portion 70 provided with the OBL 11, 12 is driven substantially along the tracking direction Dr that is a direction substantially along the radial direction Dr of the optical disc; zero is input into each of the coefficients A31, A32, and A34 of the above formula (A), the formula (1), the formula (2), and the formula (3); arbitrary numerical values other than zero are input into the coefficients A11, A12, A21, A22, and A33; and arbitrary numerical values other than zero are input into the coefficients A13 and A23, where the coefficients A13 and A23 are opposite to each other in sign, and are substantially the same in absolute value; and further, arbitrary numerical values other than zero, which are substantially the same, are input into the coefficients A14 and A24.

As a result, when the movable actuator main body portion 70 provided with the OBL 11, 12 of the OPU 2 is driven substantially along the tracking direction Dr that is a direction substantially along the radial direction Dr of the optical disc, for example, there is avoided the occurrence of rolling in the movable actuator main body portion 70 provided with the OBL 11, 12 of the OPU 2.

For example, in the actuator 80 of the OPU 2 having the first focus/tilt coil 31 and the second focus/tilt coil 32 arranged respectively at the end portions 26 and 27 of each of the side walls 22, 25 opposed to each other in the lens holder 20 in substantially a rectangular box shape, and having the tracking coil 33 arranged between the first focus/tilt coil 31 and the second focus/tilt coil 32, and having the three-pole magnets (not shown) arranged side by side corresponding to the three coils 31, 32, 33 that are the first focus/tilt coil 31, the second focus/tilt coil 32, and the tracking coil 33 arranged side by side; there are concerns that an unnecessary driving force is generated in the first focus/tilt coil 31 and the second focus/tilt coil 32 substantially along the focus direction Df that is a direction substantially along the optical axis direction Df of the OBL 11, 12; when the movable actuator main body portion 70 including the tracking coil 33 of the OPU 2 is driven substantially along the tracking direction Dr that is a direction substantially along the radial direction Dr of the optical disc.

However, if rolling is to occur in the movable actuator main body portion 70 provided with the OBL 11, 12 of the OPU 2 when the movable actuator main body portion 70 provided with the OBL 11, 12 of the OPU 2 is driven substantially along the tracking direction Dr; zero is input into each of the coefficients A31, A32, and A34 of the above formula (A), the formula (1), the formula (2), and the formula (3); arbitrary numerical values other than zero are input into the coefficients A11, A12, A21, A22, and A33; arbitrary numerical values other than zero are input into the coefficients A13 and A23, where the coefficient A13 and A23 are opposite to each other in sign, and are substantially the same in absolute value, and further, an arbitrary numerical value other than zero is input into the coefficient A14 of the formula (A) or the formula (1), and an arbitrary numerical value other than zero is input into the coefficient A24 of the formula (A) or the formula (2), where the coefficients A14 and A24 are substantially the same; the driving signal FO1 expressed by the formula (A) or the formula (1) is input into the first focus/tilt coil 31; and the driving signal FO2 expressed by the formula (A) or the formula (2) is input into the second focus/tilt coil 32; and thereby, an unnecessary driving force generated in the first focus/tilt coil 31 and an unnecessary driving force generated in the second focus/tilt coil 32 are mutually cancelled; and thereby, there is avoided the occurrence of rolling in the movable actuator main body portion 70 provided with the OBL 11, 12 of the OPU 2.

That will be explained using a specific example. The driving signal FO1 at that time is determined on the basis of the following formula (13), for example:

$$FO1 = (+0.5 \times FE) + (+0.5 \times TILT) + (-0.1 \times TE) + (-0.02 \times TE^2) \quad (13)$$

Also, the driving signal FO2 at that time is determined on the basis of the following formula (14), for example:

$$FO2 = (+0.5 \times FE) + (-0.5 \times TILT) + (+0.1 \times TE) + (-0.02 \times TE^2) \quad (14)$$

Also, the driving signal TR at that time is determined on the basis of the following formula (15), for example:

$$TR = (0 \times FE) + (0 \times TILT) + (+1 \times TE) + (0 \times TE^2) \quad (15)$$

By setting numerical values opposite to each other in sign for the numerical values to be input into the coefficients A13 and A23 in the formula (A); or by setting numerical values opposite to each other in sign for the numerical values to be input into the coefficients A13 and A23 as in the formula (10) and the formula (11) or as in the formula (13) and the formula (14); there are improved the IO characteristics of the movable actuator main body portion 70 including the coils 31, 32, 33, OBL 11, 12, the lens holder 20, and the like constituting the actuator 80. Also, by setting the numerical values opposite to each other in sign for the numerical values to be input into the coefficients A13 and A23, an appropriate rolling moment is applied to the coils 31, 32, 33 constituting the actuator 80 and the lens holder 20 provided with the OBL 11, 12, when the tracking driving of the coils 31, 32, 33 constituting the actuator 80 and the lens holder 20 provided with the OBL 11, 12 is carried out. There is therefore suppressed IO defects or rolling in the coils 31, 32, 33 constituting the actuator 80 and the lens holder 20 provided with the OBL 11, 12.

Figure 6:
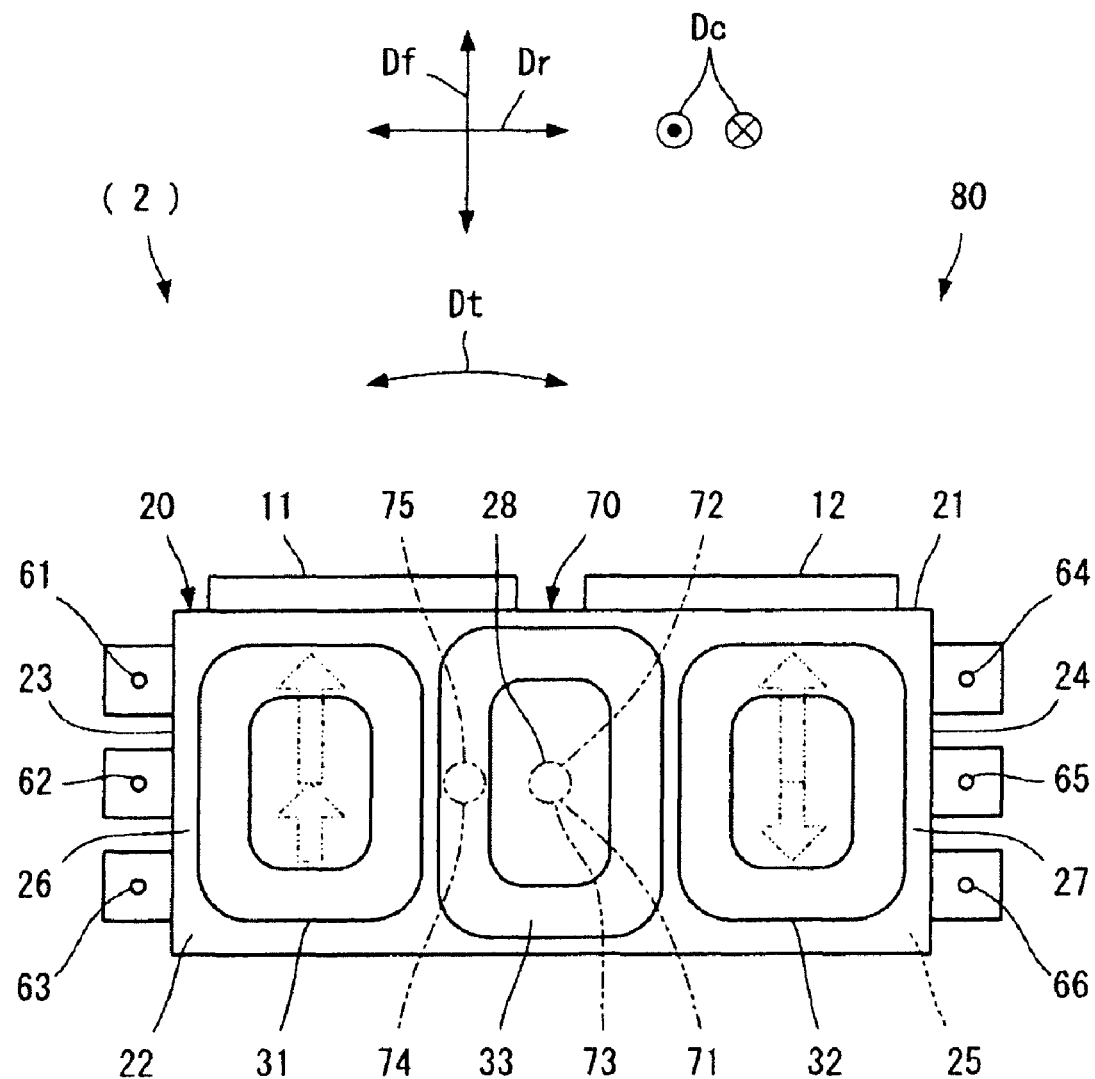
FIG. 6 is a side view illustrating the pickup apparatus according to an embodiment of the present invention.

FIG. 6 is an explanatory diagram illustrating a state where the rotation center portion 74 that is the center portion 74 when the movable actuator main body portion 70 is tilted and rotated is positioned on the left side of the center of gravity portion 73 of the movable actuator main body portion 70, in a side view of the movable actuator main body portion 70 taken from the side of the tilt rotation center axis penetration portion 75 of the movable actuator main body portion 70 constituting the OPU 2.

Although the rotation center portion 74 of the movable actuator main body portion 70 and the center of gravity portion 73 are so indicated as to be away from each other for convenience, an actual distance between the rotation center portion 74 of the movable actuator main body portion 70 and the center of gravity portion 73 is short.

For example, the case will be described hereinafter, where the center of gravity portion 73 of the movable actuator main body portion 70, the tracking application point portion 72 that is the center portion 72 of an electromagnetic force exerted on the tracking coil 33, the focus/tilt application point portion 71 that is the resultant force point portion 71 of an electromagnetic force exerted on the first focus/tilt coil 31 and the second focus/tilt coil 32 are substantially matched, and where the focus/tilt application point portion 71 and the rotation center portion 74 that is the center portion 74 when the movable actuator main body portion 70 is tilted and rotated are not matched.

When the movable actuator main body portion 70 provided with the OBL 11, 12 is driven substantially along the focus direction Df that is a direction substantially along the optical axis direction Df of the OBL 11, 12; zero is input into each of the coefficients A13, A14, A23, A24, A31, A32, and A34 of the formula (A), the formula (1), the formula (2), and the formula (3); arbitrary numerical values other than zero are input into the coefficients A12, A22, and A33; arbitrary numerical values other than zero are input into the coefficients A11 and A21, where the coefficients A11 and A21 have the numerical values different from each other but closely analogous to each other.

As a result, the IO characteristics of the movable actuator main body portion 70 of the OPU 2 are improved.

In the case where the center of gravity portion 73 of the movable actuator main body portion 70, the tracking application point portion 72 that is the center portion 72 of an electromagnetic force exerted on the tracking coil 33, and the focus/tilt application point portion 71 that is the resultant force point portion 71 of an electromagnetic force exerted on the first focus/tilt coil 31 and the second focus/tilt coil 32 are substantially matched, and in the case where the focus/tilt application point portion 71 and the rotation center portion 74 that is the center portion 74 when the movable actuator main body portion 70 is tilted and rotated are not matched, in a side view of the movable actuator main body portion 70 taken from the side of the tilt rotation center axis penetration portion 75 of the movable actuator main body portion 70; if the IO characteristics of the movable actuator main body portion 70 of the OPU 2 are poor because of the displacement of the rotation center portion 74 of the movable actuator main body portion 70 with respect to the focus/tilt application point portion 71 in the horizontal direction i.e. along the radial direction Dr of the optical disc, when the movable actuator main body portion 70 provided with the OBL 11, 12 of the OPU 2 is driven substantially along the focus direction Df; an arbitrary numerical value other than zero is input into the coefficient A11 in the formula (A) or the formula (1), and an arbitrary numerical value other than zero is input into the coefficient A21 in the formula (A) or the formula (2), where the coefficients A11 and A21 have the numerical values different from each other but closely analogous to each other; and thereby, the corrected driving signal. FO1 is input into the first focus/tilt coil 31 and the corrected driving signal FO2 is input into the second focus/tilt coil 32; and as a result, a difference is provided between the driving signal FO1 input into the first focus/tilt coil 31 and the driving signal FO2 input into the second focus/tilt coil 32. Therefore, the IO characteristics of the movable actuator main body portion 70 of the OPU 2 are improved.

That will be explained using a specific example. The driving signal FO1 at that time is determined on the basis of the following formula (16), for example:

$$FO1=(+0.55 \times FE)+(+0.5 \times TILT)+(0 \times TE)+(0 \times TE^2) \quad (16)$$

Also, the driving signal FO2 at that time is determined on the basis of the following formula (17), for example:

$$FO2=(+0.45 \times FE)+(-0.5 \times TILT)+(0 \times TE)+(0 \times TE^2) \quad (17)$$

Also, the driving signal TR at that time is determined on the basis of the following formula (18), for example:

$$TR=(0 \times FE)+(0 \times TILT)+(+1 \times TE)+(0 \times TE^2) \quad (18)$$

Figure 7:
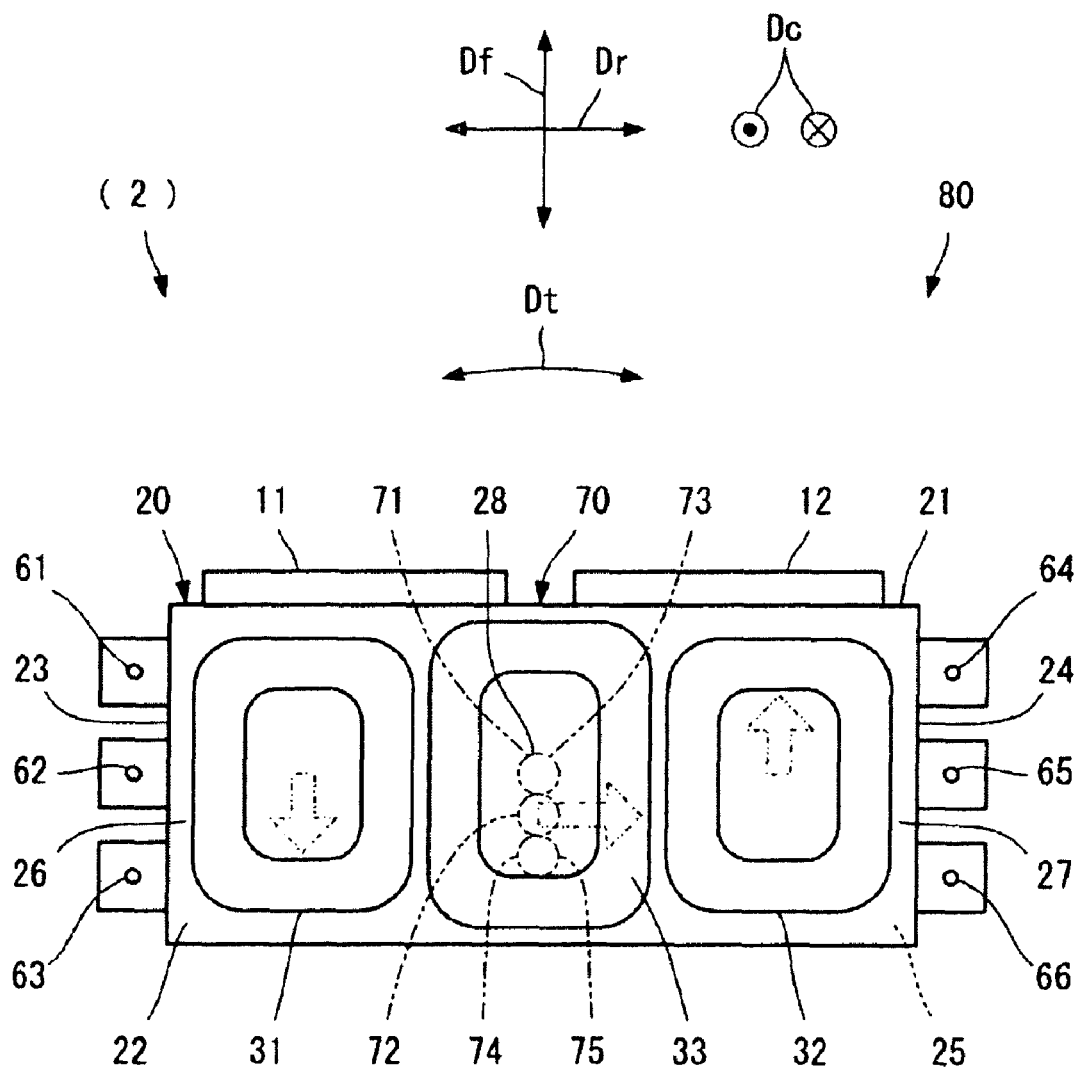
FIG. 7 is a side view illustrating the pickup apparatus according to an embodiment of the present invention.

FIG. 7 is an explanatory diagram illustrating a state where the tracking application point portion 72 that is the center portion 72 of an electromagnetic force exerted on the tracking coil 33 is positioned below the center of gravity portion 73 of the movable actuator main body portion 70, and where the rotation center portion 74 that is the center portion 74 when the movable actuator main body portion 70 is tilted and rotated is positioned below the center of gravity portion 73 of the movable actuator main body portion 70 and the tracking application point portion 72, in a side view of the movable actuator main body portion 70 taken from the side of the tilt rotation center axis penetration portion 75 of the movable actuator main body portion 70 constituting the OPU 2.

Although the tracking application point portion 72 of the movable actuator main body portion 70 and the center of gravity portion 73 are so indicated as to be away from each other, an actual distance between the tracking application point portion 72 of the movable actuator main body portion 70 and the center of gravity portion 73 is short. Also, although the rotation center portion 74 of the movable actuator main body portion 70 and the center of gravity portion 73 and/or the tracking application point portion 72 are so indicated as to be away from each other, an actual distance between: the rotation center portion 74 of the movable actuator main body portion 70; and the center of gravity portion 73 and/or the tracking application point portion 72 is short.

FIG. 8 showing a relation between a rolling frequency and a gain generated in the movable actuator main body portion 70 provided with the OBL 11, 12 of the OPU 2, is a waveform diagram illustrating a state where the rolling frequency of the movable actuator main body portion 70 including the coils 31, 32, 33 and the like is a low frequency. FIG. 9 showing a relation between a rolling frequency and a gain generated in the movable actuator main body portion 70 provided with the OBL 11, 12 and the like of the OPU 2, is a waveform diagram illustrating a state where the rolling frequency of the movable actuator main body portion 70 including the coils 31, 32, 33 and the like is a high frequency.

For example, in the case where the rotation center portion 74 that is the center portion 74 when the movable actuator main body portion 70 is tilted and rotated, the center of gravity portion 73 of the movable actuator main body portion 70, and the tracking application point portion 72 that is the center portion 72 of an electromagnetic force exerted on the tracking coil 33 are not matched, in a side view of the movable actuator main body portion 70 taken from the side of the tilt rotation center axis penetration portion 75 of the movable actuator main body portion 70; if rolling is to occur in the movable actuator main body portion 70 provided with the OBL 11, 12, when the movable actuator main body portion 70 provided with the OBL 11, 12 is driven; zero is input in each of the coefficients A31, A32, and A34 of the above formula (A), the formula (1), the formula (2), and the formula (3); arbitrary numerical values other than zero are input into the coefficients A11, A12, A21, A22, and A33; arbitrary numerical values other than zero are input into the coefficients A13 and A23; arbitrary numerical values other than zero are input into the coefficients A14 and A24; and the numerical values to be input into the coefficients A13 and A23 are varied depending on the rolling frequency of the movable actuator main body portion 70 provided with the OBL 11, 12.

By varying the numerical values to be input into the coefficients A13 and A23 depending on the rolling frequency of the movable actuator main body portion 70 provided with the OBL 11, 12, the IO characteristics of the movable actuator main body portion 70 of the OPU 2 are compensated, and the rolling suppression characteristics of the movable actuator main body portion 70 provided with the OBL 11, 12 of the OPU 2 are compensated depending on the rolling frequency of the movable actuator main body portion 70 provided with the OBL 11, 12.

For example, in the case where a frequency in the vicinity of approximately 200 Hz (hertz) is defined as an approximate boundary between the low frequency of the rolling frequency and the high frequency of the rolling frequency, if the rolling frequency of the movable actuator main body portion 70 provided with the OBL 11, 12 is a low frequency equal to or lower than the frequency in the vicinity of approximately 200 Hz, the IO characteristics of the movable actuator main body portion 70 of the OPU 2 are compensated, for example. If the rolling frequency of the movable actuator main body portion 70 provided with the OBL 11, 12 is a high frequency exceeding the frequency in the vicinity of approximately 200 Hz, the rolling suppression characteristics of the movable actuator main body portion 70 provided with the OBL 11, 12 of the OPU 2 are compensated, for example.

Depending on the rolling frequency of the movable actuator main body portion 70 provided with the OBL 11, 12, the coefficients A13 and A23 are varied as follows. For example, if the rolling frequency generated in the movable actuator main body portion 70 provided with the OBL 11, 12 is a frequency in the vicinity of approximately 200 Hz, the numerical values to be input into the coefficients A13 and A23 are changed to ±0.1, ±0.2, or the like, for example, with this frequency as an approximate boundary.

For example, if the rolling suppression characteristics of movable actuator main body portion 70 provided with the OBL 11, 12 of the OPU 2 are to be compensated, ±0.1 is input into A13, and −0.1 is input into A23, for example. The values of +0.1 and −0.1 at this time are defined as a compensation value Q1, for example. In this case, for example, the following formula (19), the formula (20), and the formula (21) are set by the actuator controller of the OPU 2.

$$FO1=(+0.5 \times FE)+(+0.5 \times TILT)+(+0.1 \times TE)+(-0.02 \times TE^2) \quad (19)$$

$$FO2=(+0.5 \times FE)+(-0.5 \times TILT)+(-0.1 \times TE)+(-0.02 \times TE^2) \quad (20)$$

$$TR=(0 \times FE)+(0 \times TILT)+(+1 \times TE)+(0 \times TE^2) \quad (21)$$

Also, if the IO characteristics of the movable actuator main body portion 70 of the OPU 2 are to be compensated, for example, −0.2 is input into A13, and +0.2 is input into A23, for example. The values of −0.2 and +0.2 at this time are defined as a compensation value Q2, for example. In this case, for example, the following formula (22), the formula (23), and the formula (24) are set by the actuator controller of the OPU 2 in the optical disc apparatus 1.

$$FO1=(+0.5 \times FE)+(+0.5 \times TILT)+(-0.2 \times TE)+(-0.02 \times TE^2) \quad (22)$$

$$FO2=(+0.5 \times FE)+(-0.5 \times TILT)+(+0.2 \times TE)+(-0.02 \times TE^2) \quad (23)$$

$$TR=(0 \times FE)+(0 \times TILT)+(+1 \times TE)+(0 \times TE^2) \quad (24)$$

For example, in the case where the tracking application point portion 72, the center of gravity portion 73, and the rotation center portion 74 of the movable actuator main body portion 70 including the coils 31, 32, 33, OBL 11, 12, the lens holder 20, and the like constituting the actuator 80 cannot be matched, if the coefficient A13 in the formula (A) or the formula (1) and the coefficient A23 in the formula (A) or the formula (2) remain at a constant of a predetermined numerical value, it was difficult for the movable actuator main body portion 70 including the coils 31, 32, 33, OBL 11, 12, the lens holder 20, and the like constituting the conventional actuator 80, to solve both IO defects and the occurrence of rolling in the movable actuator main body portion 70. For the movable actuator main body portion 70 of the conventional OPU 2, it was possible to solve only either IO defect or the occurrence of rolling, but difficult to solve both IO defects and the occurrence of rolling.

However, by giving a fluctuating frequency response to the coefficient A13 in the formula (A) or the formula (1), and to the coefficient A23 in the formula (A) or the formula (2), there can be solved both IO defects and the occurrence of rolling in the movable actuator main body portion 70 including the coils 31, 32, 33, OBL 11, 12, the lens holder 20, and the like constituting the actuator 80.

A control method of the OPU 2 of giving a fluctuating frequency response for example to the coefficient A13 in the formula (A) or the formula (1) and the coefficient A23 in the formula (A) or the formula (2) by varying the numerical values to be input into the coefficient A13 in the formula (A) or the formula (1) and the coefficient A23 in the formula (A) or the formula (2) depending on the rolling frequency of the movable actuator main body portion 70 of the OPU 2, may be also applied, when the control method of the OPU 2 shown in FIGS. 1 to 6 for example is carried out.

Setting of an optimal compensation parameter for each actuator 80 will be described hereinafter.

At the present situation, for tilt compensation, a tilt command value (TILT command value) is determined by an evaluation of maximization (DPPmax) of a differential push-pull (DPP) and the like, for example. This is to respond to an optical disc in which "warping" and the like occurs, for example, and by giving a quasi steady voltage to the correction tilt amount signal TILT, for example, the movable actuator main body portion 70 including the coils 31, 32, 33, OBL 11, 12, the lens holder 20, and the like is inclined.

For the normal optical disc in which the "warping" and the like does not occur, a tuning test of the OPU 2 and the like in two ways of the low frequency region and the high frequency region is conducted with a frequency of approximately 150 Hz, approximately 200 Hz, and the like as an approximate boundary, for example, and the compensation values Q1, Q2 and the like can be set for each OPU 2, for example.

By configuring as above, a servo characteristic for compensating manufacturing fluctuation when the actuator 80 of the OPU 2 is manufactured is ensured, and a product characteristic of the OPU 2 is stabilized, and a drastic expansion in design freedom of the OPU 2 is realized. Therefore, further performance improvement of the OPU 2 is achieved.

Also, by carrying out the control method of the OPU 2, there is no longer a need to actually wire the tracking coil 33 in a tilt portion as before, for example.

The OPU 2 includes the storage portion 8 (FIG. 10) capable of storing the coefficients A11, A12, A13, A14, A21, A22, A23, A24, A31, A32, A33, and A34 to be input into the formula (A), the formula (1), the formula (2), or the formula (3).

Since the OPU 2 is configured with the storage portion 8 capable of storing the coefficients A11, A12, A13, A14, A21, A22, A23, A24, A31, A32, A33, and A34, there can be provided the OPU 2 capable of avoiding the occurrence of IO defects for example of the OPU 2 caused by an error in a manufacturing process of the OPU 2, for example. Alternatively, since the OPU 2 is configured with the storage portion 8 capable of storing the coefficients A11, A12, A13, A14, A21, A22, A23, A24, A31, and A32, A33, A34, there can be provided the OPU 2 capable of avoiding the occurrence of rolling in the OBL 11, 12 in operation of the OPU 2, for example. By incorporating the OPU 2 including the storage portion 8 into the optical disc apparatus 1, for example, there is constituted the optical disc apparatus 1 capable of solving easily each of the above problems.

Subsequently, the disc apparatus 1 and the control method thereof will be explained more specifically.

FIG. 10 is a block diagram illustrating the disc apparatus 1, and FIG. 11 is a calculation block diagram illustrating a calculation processing path when the driving signals FO1, FO2, TR are obtained by calculations in the control portion 100 in the disc apparatus 1.

The optical disc apparatus 1 is capable of being equipped with any of the OPUs 2 shown in FIGS. 1 to 7 and the like for example.

Also, the optical disc apparatus 1 (FIG. 10) includes the DSP 100 configured to carry out calculations on the basis of at least one of the formulas of the formula (A), the formula (1), the formula (2), and the formula (3) accurately and rapidly. The DSP 100 of the optical disc apparatus 1 for example can carry out calculations on the basis of the formula (A), the formula (1), the formula (2), or the formula (3) accurately and rapidly. Also, the system control portion 100 of the optical desk apparatus 1 for example constitutes the DSP 100 capable of carrying out calculations on the basis of an arbitrary plurality of formulas out of the formula (1), the formula (2), and the formula (3) accurately and rapidly.

More specifically, the system control portion 100 of the optical disc apparatus 1 constitutes the DSP 100 capable of carrying out calculations on the basis of all formulas out of the formula (A), the formula (1), the formula (2), and the formula (3) accurately and rapidly at the same time.

Also, the optical disc apparatus 1 includes the CPU 110 configured to carry out calculations on the basis of at least one of the formula (A), the formula (1), the formula (2), and the formula (3) accurately and rapidly.

Also, the optical disc apparatus 1 includes a driver 120 (FIG. 10) configured to receive a driving/control signal output from the CPU 110 of the DSP 100, and supply a driving/control signal to each of the coils 31, 32, 33 (FIGS. 1 to 7) attached to the OPU 2.

The optical disc apparatus 1 is configured with: any of the OPUs 2 shown in FIGS. 1 to 7 and the like for example; the DSP 100 (FIG. 10) configured to carry out calculations on the basis of at least one of the formula (A), the formula (1), the formula (2), and the formula (3) accurately and rapidly; and the driver 120.

The control method of the optical apparatus 1 of carrying out the attitude control and the like of the movable actuator main body portion 70 of the differential actuator 80 (FIGS. 1 to 7) constituting the OPU 2 using the optical disc apparatus 1 constituted as above is carried out on the basis of at least one of the formula (A), the formula (1), the formula (2), and the formula (3).

For example, when the focus error signal FE, the tracking error signal TE, the correction tilt amount signal TILT are input into the software X (FIG. 11), and calculations on the basis of the formula (A), the formula (1), the formula (2), or the formula (3) are carried out by the software X, and thereby, each of the driving signals FO1, FO2, TR is output.

Since the optical disc apparatus 1 including the DSP 100 configured to carry out calculations on the basis of the formula (A), the formula (1), the formula (2), or the formula (3) accurately and rapidly is constituted as above and the control method of the optical disc apparatus 1 of carrying out a calculation processing of each of the formula (A), the formula (1), the formula (2), and the formula (3) is carried out by the software X, there is avoided the occurrence of IO defects for example of the movable actuator main body portion 70 of the OPU 2 caused by an error in a manufacturing process in the individual differential actuator 80 constituting the OPU 2 in the differential focus/tilt type for example.

Alternatively, there is avoided the occurrence of rolling in the movable actuator main body portion 70 provided with the OBL 11, 12 in operation of the differential actuator 80 of the OPU 2. Calculations on the basis of at least one of the formula (A), the formula (1), the formula (2), and the formula (3), that is: calculations on the basis of the formula (1); calculations on the basis of the formula (2); calculations on the basis of the formula (3); calculations on the basis of an arbitrary plurality of formulas out of the formula (A), the formula (1) the formula (2), and the formula (3); or calculations on the basis of all formulas out of the formula (A), the formula (1), the formula (2), and the formula (3) are carried out by the DSP 100 of the optical disc apparatus 1 accurately and rapidly.

As a result, there can be provided the optical disc apparatus 1 in which the IO characteristics of the movable actuator main body portion 70 of the OPU 2 and the rolling suppression characteristic of the movable actuator main body portion 70 provided with the OBL 11, 12 of the OPU 2 are compensated and the control method thereof.

For example, if a manufacturing fluctuation is generated among the OPUs 2 due to differences in manufacturing sites/environments and the like of the OPU 2, the optimal compensation parameters required for each OPU 2 might become different. Even in such a case, by storing the optimal compensation parameters required for each OPU 2 in advance as component information of the OPU 2 in the storage portion 8 such as the EEROM 8 and the like of the OPU 2, for example, and by loading the optimal compensation parameter stored in advance from the storage portion 8 such as the EEROM 8 and the like in the optical disc apparatus 1 such as a drive apparatus into the CPU 110 of the DSP 100, there becomes no longer needed a tuning work and the like of the optimal compensation parameter and the like required for each OPU 2, for example. Therefore, the setting work of the optimal compensation parameter required for each OPU 2 is carried out easily and rapidly. The control method of the optical disc apparatus 1 is carried out easily and rapidly by the so-called program such as software, firmware, and the like provided in the DSP 100.

Subsequently, the OPU 2 and the optical disc apparatus 1 capable of carrying out the attitude control and the like of the movable actuator main body portion 70 of the differential actuator 80 using the algorithm and the control method thereof will be described in more detail.

As mentioned above, the OPU 2 of the differential focus/tilt type includes at least a plurality of the coils 31, 32, 33 constituting the movable actuator main body portion 70 of the differential actuator 80.

The control method of the OPU 2 of carrying out the attitude control and the like of the movable actuator main body portion 70 of the differential actuator 80 constituting the OPU 2 using the OPU 2 of the differential focus/tilt type constituted as above is carried out as follows.

For example, after the driving signals FO1, FO2 determined on the basis of at least the formula (1) and the formula (2) are obtained by calculations using the algorithm on the basis of at least the formula (1) and the formula (2), each of driving signals FO1, FO2 is input into the OPU 2 of the differential focus/tilt type. Thereby, the occurrence of each of the above problems is avoided.

More specifically, when the movable actuator main body portion 70 of the differential actuator 80 of the OPU 2 is driven, the driving signals FO1, FO2, TR to be sent to the differential actuator 80 of the OPU 2 are obtained by calculations on the basis of either one of or both of the focus error signal FE and the tracking error signal TE, and/or the correction tilt amount signal TILT, using the compensation algorithm for the driving program X for driving the OPU 2 of the differential focus/tilt type.

The driving signal FO1 to be sent to the first focus/tilt coil 31 of the movable actuator main body portion 70 of the differential actuator 80 is obtained by calculations on the basis of the compensation algorithm. Also, the driving signal FO2 to be sent to the second focus/tilt coil 32 of the movable actuator main body portion 70 of the differential actuator 80 is obtained by calculations on the basis of the compensation algorithm. Also, the driving signal TR to be sent to the tracking coil 33 of the movable actuator main body portion 70 of the differential actuator 80 is obtained by calculations on the basis of the compensation algorithm.

By inputting each of the driving signals FO1, FO2, TR obtained by calculations using the compensation algorithm into the OPU 2 of the differential focus/tilt type, there is avoided the occurrence of IO defects for example of the movable actuator main body portion 70 of the OPU 2 caused by an error in a manufacturing process in the individual differential actuator 80 constituting the OPU 2 in the differential focus/tilt type for example. Alternatively, there is avoided the occurrence of rolling in the movable actuator main body portion 70 including a plurality of the coils 31, 32, 33 in operation of the differential actuator 80 of the OPU 2. Since the compensation algorithm is added to the driving program X for driving the OPU 2 and each of the driving signals FO1, FO2, TR is obtained by calculations using the compensation algorithm, the occurrence of each of the above problems is avoided.

The algorithm used in operation of the actuator 80 including the coils 31, 32, 33 and the like will be described below in detail. A transmission matrix for distributing the general driving signals FO1, FO2, TR used for driving the actuator 80 of the OPU 2 in the differential focus/tilt type, which is the so-called basic matrix, is determined on the basis of the following formula (B). Similar to the formula (A), the following formula (B) is a matrix equation, for example. The formula (B) is a matrix equation provided for easy-to-understand explanation of the formula (A).

$$\begin{bmatrix} FO1 \\ FO2 \\ TR \end{bmatrix} = \begin{bmatrix} A11 & A12 & A13 & A14 \\ A21 & A22 & A23 & A24 \\ A31 & A32 & A33 & A34 \end{bmatrix} \begin{bmatrix} FE \\ TILT \\ TE \\ TE^2 \end{bmatrix} \quad (B)$$

where FO1 represents a driving signal to be input into first focus/tilt coil; FO2 represents a driving signal to be input into second focus/tilt coil; TR represents a driving signal to be input into tracking coil; A11, A12, A13, A14, A21, A22, A23, A24, A31, A32, A33, and A34 are coefficients having arbitrary numerical values; FE represents a focus error signal; TE represents a tracking error signal; and TILT represents a correction tilt amount signal.

The driving signal FO1 to be sent to the first focus/tilt coil 31 of the movable actuator main body portion 70 of the differential actuator 80 is obtained by calculations on the basis of the formula (B). Also, the driving signal FO2 to be sent to the second focus/tilt coil 32 of the movable actuator main body portion 70 of the differential actuator 80 is obtained by calculations on the basis of the formula (B). Also, the driving signal TR to be sent to the tracking coil 33 of the movable actuator main body portion 70 of the differential actuator 80 is obtained by calculations on the basis of the formula (B).

By means of calculations on the basis of the formula (B), IO defects in the movable actuator main body portion 70 of the OPU 2 and the occurrence of rolling in the movable actuator main body portion 70 of the OPU 2 are avoided. Since the compensation algorithm on the basis of the formula (B) is used in the driving program X for driving the OPU 2 in order to optimally distribute the driving force in the three directions that are the focus direction Df, the tracking direction Dr, and the tilt direction Dt, each of the driving signals FO1, FO2, TR to be sent to the differential actuator 80 of the OPU 2 is obtained by calculations. Since the driving signal FO1 to be sent to the first focus/tilt coil 31, the driving signal FO2 to be sent to the second focus/tilt coil 32, and the driving signal TR to be sent to the tracking coil 33 of the movable actuator main body portion 70 of the differential actuator 80 are obtained by calculations on the basis of the formula (B), the occurrence of each of the problems is avoided.

The optical disc apparatus 1 is configured with: any of the OPUs 2 shown in FIGS. 1 to 7 and the like for example; the DSP 100 including the CPU 110 (FIG. 10), the ROM 111, and the RAM 112, which is configured to carry out a calculation on the basis of the formula (B) accurately and rapidly; and the driver 120.

Using the optical disc apparatus 1 constituted as above, the control method of the optical disc apparatus 1 of carrying out the attitude control and the like of the movable actuator main body portion 70 of the differential actuator 80 (FIGS. 1 to 7) constituting the OPU 2 is carried out on the basis of the formula (B).

For example, when the focus error signal FE, the tracking error signal TE, the correction tilt amount signal TILT are input into the software X (FIG. 11) and calculations on the basis of the formula (B) are carried out by the software X, and thereby, each of the driving signals FO1, FO2, TR is output.

Since there is constituted the optical disc apparatus 1 including the DSP 100 configured to carry out calculations on the basis of the formula (B) accurately and rapidly, and there is carried out, by the software X, the control method of the optical disc apparatus 1 of carrying out a calculation processing of the formula (B), there is avoided the occurrence of IO defects of the movable actuator main body portion 70 of the OPU 2 caused by an error in a manufacturing process in the individual differential actuator 80 constituting the OPU 2 in the differential focus/tilt type for example.

Alternatively, there is avoided the occurrence of rolling in the movable actuator main body portion 70 including the OBL 11, 12, the coils 31, 32, 33 such as the first focus/tilt coil 31, the second focus/tilt coil 32, the tracking coil 33, and the like in operation of the differential actuator 80 of the OPU 2. Since the compensation algorithm on the basis of the formula (B) is added to the driving program X for driving the OPU 2 and each of the driving signals FO1, FO2, TR is obtained by calculations using the compensation algorithm, there can be provided the optical disc apparatus 1 capable of avoiding the occurrence of each of the problems and the control method thereof.

Calculations on the basis of the formula (B) are carried out by the DSP 100 of the optical disc apparatus 1 accurately and rapidly. As a result, there can be provided the optical disc apparatus 1 in which the IO characteristics of the movable actuator main body portion 70 of the OPU 2 and the rolling suppression characteristics of the movable actuator main body portion 70 of the OPU 2 are compensated and the control method thereof.

The OPU 2 and the optical disc apparatus 1 including the OPU 2 can be used in a recording/reproducing apparatus configured to record data/information/signals and the like in the various optical discs 200 and reproduce data/information/signals and the like of the various optical discs 200. Also, the OPU 2 and the optical disc apparatus 1 including the OPU 2 can be also used in a play-only apparatus configured to reproduce the data/information/signals and the like of the various optical discs 200.

Also, the OPU 2 is mounted on the optical disc apparatus 1 to be incorporated in a computer, an audio/video apparatus, a game machine, an on-board machine (none of them is shown), and the like, for example. Also, the optical disc apparatus 1 including the OPU 2 can be mounted on computers such as a notebook personal computer (PC: personal computer), a laptop PC, a desktop PC, an on-board computer, game machines such as a computer game machine, audio and/or video apparatuses such as a CD player/CD recorder, DVD player/DVD recorder, and the like (none of them is shown), for example. Also, the optical disc apparatus 1 including the OPU 2 can handle a plurality of types of media 200 such as CD optical discs, DVD optical discs, "HD-DVD" optical discs, "Blu-ray Disc" optical discs, and the like, for example. The optical disc apparatus 1 including the OPU 2 can be mounted on the computers, audio and/or video apparatuses, game machines, on-board machines, and the like capable of handling the various optical discs 200 such as "CD", "DVD", "HD-DVD", "Blu ray Disc", and the like (none of them is shown).

Instead of the OPU 2 equipped with the two OBLs 11, 12, for example, the OPU equipped with one OBL (not shown) may be used. Also, instead of the lens holder 20 in the two-piece structure, for example, the lens holder in a one-piece structure (not shown) may be used. Also, instead of the LD 4 capable of emitting the laser light A having a plurality of types of wavelengths, for example, a LD capable of emitting the laser light A having a single wavelength (not shown) may be used. Also, instead of the light receiving portion in substantially a rectangular shape on a plan view divided in substantially an equal manner into four segments each being in substantially a rectangular shape on a plan view, for example, a light receiving portion in substantially a rectangular shape on a plan view divided in substantially an equal manner into two segments each being in substantially a rectangular shape on a plan view (not shown) may be constituted in PDIC. Also, instead of the diffraction grating divided into four parts, for example, a diffraction grating divided into two parts or a diffraction grating divided into three parts (none of them is shown) may be used. Also, the control method of the OPU 2 may be carried out by the OPU in which the tracking coil 33 is wired in a tilt portion, for example. Also, the second storage circuit portion 112 such as the RAM 112 and the like does not have to be mounted on the DSP 100 of the optical disc apparatus 1, but may be omitted, for example.

Second Embodiment

Figure 12:
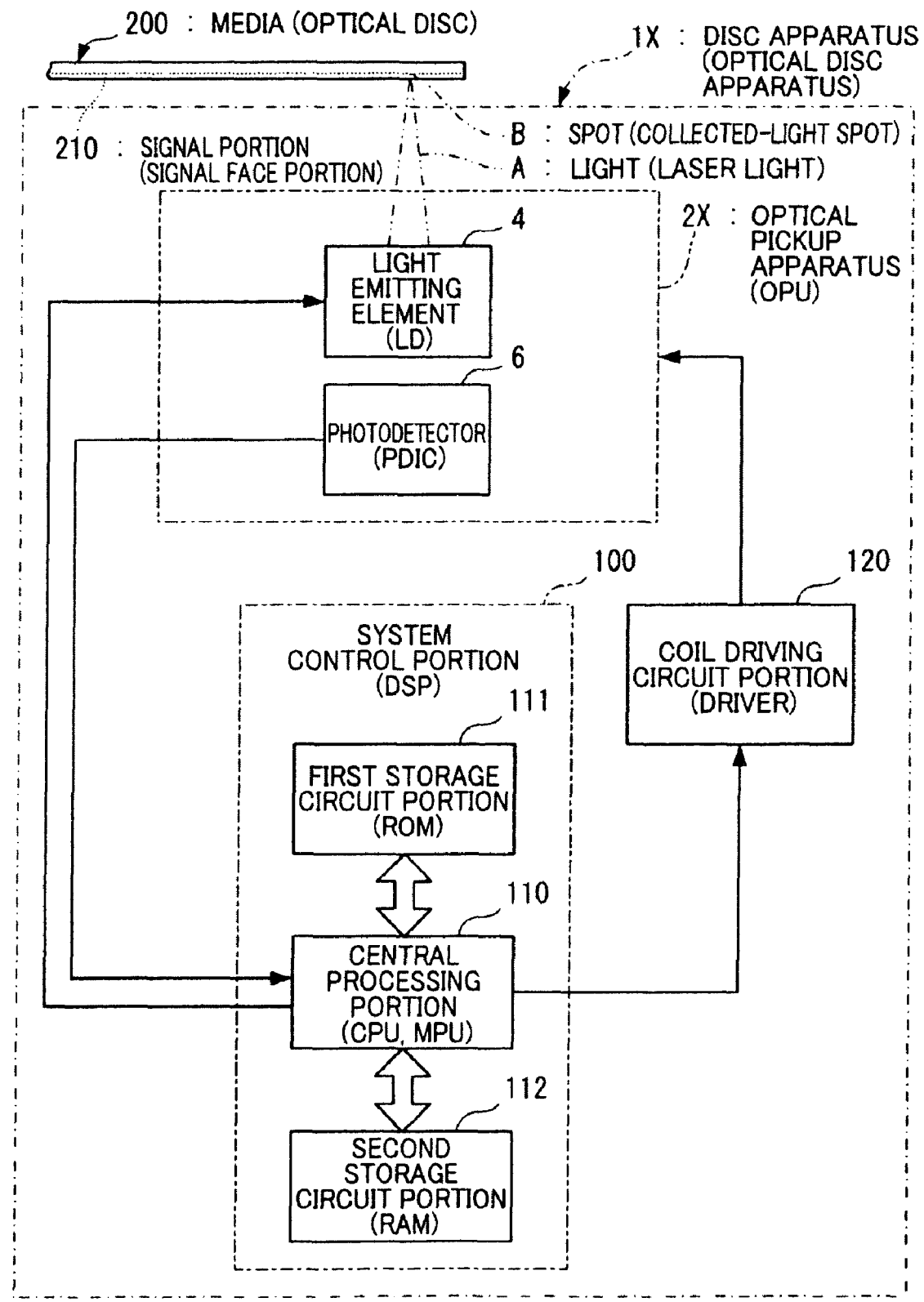
FIG. 12 is an explanatory diagram illustrating a disc apparatus according to a second embodiment of the present invention.

FIG. 12 is a diagram illustrating a disc apparatus according to a second embodiment of the present invention.

FIG. 12 is a figure provided for convenience of easy-to-understand explanation of the disc apparatus according to a second embodiment of the present invention. In more detail, FIG. 12 is a block diagram illustrating a disc apparatus 1X.

In the optical disc apparatus 1 of the first embodiment shown in FIG. 10, the storage portion 8 such as the EEROM 8 and the like is mounted on the OPU 2 constituting the optical disc apparatus 1, and the EEROM 8 of the OPU 2 and the CPU 110 of the DSP 100 in the optical disc apparatus 1 are electrically connected to each other, while in the optical disc apparatus 1X of the second embodiment shown in FIG. 12, the storage portion such as the EEROM and the like is not mounted on a OPU 2X constituting the optical disc apparatus 1, but is omitted. Although the OPU 2 includes the EEROM 8 (FIG. 10) in the first embodiment, the storage portion such as the EEROM and the like is not mounted on the OPU 2X (FIG. 12) in the second embodiment, but is omitted. Other than the omission of the storage portion such as the EEROM and the like, the OPU 2X is in substantially the same form as that of the OPUs 2 shown in FIGS. 1 to 9. In the optical disc apparatus 1X including the OPU 2X in the second embodiment shown in FIG. 12, the same reference numerals are provided for and the detailed descriptions are omitted from those substantially similar to those in the optical disc apparatus 1 including the OPU 2 in the first embodiment shown in FIG. 10.

As mentioned above, the optical disc apparatus 1X can be equipped with the OPU 2X (FIG. 12) in which the storage portion 8 (FIG. 10) is omitted from any of the OPUs 2 in FIGS. 1 to 7 and the like, for example. Thus, the price of the optical disc apparatus 1X can kept low.

Also, the optical disc apparatus 1X includes the first storage circuit portion 111 configured to store the program for causing the CPU 110 of the DSP 100 to carry out various controls, the coefficients required for the OPU 2X, the optimal compensation parameters, and the like. Each function executed by the software and the like is stored in the first storage circuit portion 111 accessible to the CPU 110 of the DSP 100. The CPU 110 of the DSP 100 is so constituted as to cause various controls/operations to be carried out on the basis of the program stored in the first storage circuit portion 111 such as a flash ROM.

Also, the optical disc apparatus 1X includes the control portion 100 configured to carry out calculations on the basis of at least one of the formula (A), the formula (B), the formula (1), the formula (2), and the formula (3) accurately and rapidly. For example, the system control portion 100 of the optical disc apparatus 1X constitutes the DSP 100 capable of carrying out calculations on the basis of the formula (A), the formula (B), the formula (1), the formula (2), or the formula (3) accurately and rapidly. Also, the system control portion 100 of the optical disc apparatus 1X constitutes the DSP 100 capable of carrying out calculations on the basis of an arbitrary plurality of formulas out of the formula (A), the formula (B), the formula (1), the formula (2), and the formula (3) accurately and rapidly. More specifically, the system control portion 100 of the optical disc apparatus 1X constitutes the DSP 100 capable of carrying out calculations on the basis of all the formulas of the formula (A), the formula (B), the formula (1), the formula (2), and the formula (3) accurately and rapidly at the same time.

Also, the optical disc apparatus 1X includes the storage circuit portion 111 and/or 112 (storage circuit) capable of storing the coefficients A11, A12, A13, A14, A21, A22, A23, A24, A31, A32, A33, and A34 to be input into the formula (A), the formula (B), the formula (1), the formula (2), or the formula (3) in the DSP 100.

Since there is constituted the optical disc apparatus 1X including the storage circuit portion 111 and/or 112 capable of storing the coefficients A11, A12, A13, A14, A21, A22, A23, A24, A31, A32, A33, and A34 in the DSP 100, there is avoided the occurrence of IO defects for example of the OPU 2X caused by an error in a manufacturing process of the OPU 2X, for example. Alternatively, since there is constituted the optical disc apparatus 1X including the storage circuit portion 111 and/or 112 capable of storing the coefficients A11, A12, A13, A14, A21, A22, A23, A24, A31, A32, A33, and A34 in the DSP 100, there is avoided the occurrence of rolling in the OBL 11, 12 in operation of the OPU 2X, for example.

By carrying out a calculation processing of the formula (A), the formula (B), the formula (1), the formula (2), or the formula (3) in the CPU 110 in the DSP 100 of the optical disc apparatus 1X, using the required coefficients A11, A12, A13, A14, A21, A22, A23, A24, A31, A32, A33, and A34 among the coefficients A11, A12, A13, A14, A21, A22, A23, A24, A31, A32, A33, and A34 stored in the storage circuit portion 111 and/or 112 in the DSP 100 of the optical disc apparatus 1X, there is avoided the occurrence of IO defects for example of the movable actuator main body portion 70 of the OPU 2X caused by an error in a manufacturing process in the individual differential actuator 80 constituting the OPU 2X of the differential focus/tilt type, for example. Alternatively, in operation of the differential actuator 80 of the OPU 2X, the occurrence of rolling in the movable actuator main body portion 70 provided with the OBL 11, 12 is avoided.

Calculations on the basis of at least one of the formula (A), the formula (B), the formula (1), the formula (2), and the formula (3), that is: calculations on the basis of the formula (A); the calculations on the basis of the formula (B); the calculations on the basis of the formula (1); the calculations on the basis of the formula (2); the calculations on the basis of the formula (3); calculations on the basis of an arbitrary plurality of formulas out of the formula (A), formula (B), the formula (1), the formula (2), and the formula (3); or calculations on the basis of all formulas out of the formula (A), the formula (B), the formula (1), the formula (2), and the formula (3), for example, are carried out by the DSP 100 of the optical disc apparatus 1X accurately and rapidly. As a result, there can be provided: the optical disc apparatus 1X in which the IO characteristics of the movable actuator main body portion 70 of the OPU 2X and the rolling suppression characteristic of the movable actuator main body portion 70 provided with the OBL 11, 12 of the OPU 2X are compensated and the price can be kept low; and the control method thereof.

For example, if a manufacturing fluctuation is generated among the OPUs 2X due to differences in manufacturing sites/environments and the like of the OPU 2X, the optimal compensation parameters required for each OPU 2X might become different. Even in such a case, by storing the optimal compensation parameters required for each OPU 2X in advance as component information of the OPU 2X in the EEROM 111 and the like of the DSP 100 in the optical disc apparatus 1X including the OPU 2X, for example, and by reading the optimal compensation parameter stored in advance from the storage circuit portion 111 such as the EEROM 111 and the like in the optical disc apparatus 1X such as a drive apparatus into the CPU 110 of the DSP 100, there becomes no longer needed a tuning work and the like of the optimal compensation parameter and the like required for each OPU 2X, for example. Therefore, the setting work of the optimal compensation parameter required for each OPU 2X is carried out easily and rapidly. The control method of the optical disc apparatus 1X is carried out easily and rapidly by the so-called program such as software, firmware, and the like provided in the DSP 100.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A pickup apparatus comprising:
at least a coil constituting an actuator,
a signal to be sent to the coil being obtained by calculation using an algorithm on the basis of at least one of a focus error signal and a tracking error signal, wherein
the signal to be sent to the coil is obtained by calculation on the basis of the following formula (A), $$\begin{bmatrix} FO1 \\ FO2 \\ TR \end{bmatrix} = \begin{bmatrix} A11 & A12 & A13 & A14 \\ A21 & A22 & A23 & A24 \\ A31 & A32 & A33 & A34 \end{bmatrix} \begin{bmatrix} FE \\ TILT \\ TE \\ TE^2 \end{bmatrix} \quad (A)$$

where
FO1 represents a driving signal to be input into a first focus/tilt coil;
FO2 represents a driving signal to be input into a second focus/tilt coil;
TR represents a driving signal to be input into a tracking coil;
A11, A12, A13, A14, A21, A22, A23, A24, A31, A32, A33, and A34 represent coefficients having arbitrary values;
FE represents a focus error signal;
TE represents a tracking error signal; and
TILT represents a correction tilt amount signal.

2. A disc apparatus comprising:
the pickup apparatus according to claim 1; and
a control portion configured to perform the calculation using the formula (A).

3. A pickup apparatus capable of reading out a signal from a media and/or writing a signal into the media, comprising:
a lens configured to irradiate the media with light;
a first focus/tilt coil and a second focus/tilt coil, configured to drive the lens at least substantially along an optical axis direction of the lens; and
a tracking coil configured to drive the lens substantially along a radial direction of the media,
in the case where a driving signal to be input into the first focus/tilt coil is defined as FO1, and where a driving signal to be input into the second focus/tilt coil is defined as FO2, and where a driving signal to be input into the tracking coil is defined as TR, and where a focus error signal detected when out-of-focus of the light substantially along the optical axis direction of the lens with respect to the media occurs, is defined as FE, and where a tracking error signal detected when out-of-focus of the light substantially along the radial direction of the media with respect to the media occurs, is defined as TE, and where a correction tilt amount signal for correcting angle misalignment of the objective lens when a focus angle misalignment of the light with respect to the media occurs, is defined as TILT,
the driving signal to be input into the first focus/tilt coil being determined on the basis of the following formula (1), and the driving signal to be input into the second focus/tilt coil being determined on the basis of the following formula (2), and the driving signal to be input into the tracking coil being determined on the basis of the following formula (3), $$FO1 = (A11 \times FE) + (A12 \times TILT) + (A13 \times TE) + (A14 \times TE^2) \quad (1)$$

$$FO2 = (A21 \times FE) + (A22 \times TILT) + (A23 \times TE) + (A24 \times TE^2) \quad (2)$$

$$TR = (A31 \times FE) + (A32 \times TILT) + (A33 \times TE) + (A34 \times TE^2) \quad (3)$$

where the coefficients A11, A12, A13, A14, A21, A22, A23, A24, A31, A32, A33, and A34 have arbitrary values.

4. The pickup apparatus according to claim 3, wherein arbitrary values other than zero are input into the coefficients A13 and A23 as necessary, and
the coefficients A13 and A23 are opposite to each other in sign.

5. The pickup apparatus according to claim 3, wherein arbitrary values other than zero are input into the coefficients A14 and A24 as necessary.

6. The pickup apparatus according to claim 3, wherein arbitrary values other than zero are input into the coefficients A11 and A21 as necessary, and
a difference is provided between the coefficients A11 and A21.

7. The pickup apparatus according to claim 3, wherein when rolling is to occur in the lens, arbitrary values other than zero are input into the coefficients A13 and A23, and the values to be input into the coefficients A13 and A23 are varied depending on a rolling frequency of the lens.

8. The pickup apparatus according to claim 3, further comprising:
a storage portion capable of storing the coefficients A11, A12, A13, A14, A21, A22, A23, A24, A31, A32, A33, and A34.

9. A disc apparatus comprising:
the pickup apparatus according to claim 3; and
a control portion configured to carry out calculation on the basis of at least one of the formula (1), the formula (2), and the formula (3).

10. A disc apparatus comprising:
the pickup apparatus according to claim 3;
a control portion configured to carry out calculation on the basis of at least one of the formula (1), the formula (2), and the formula (3); and
a storage circuit configured to store the coefficients A11, A12, A13, A14, A21, A22, A23, A24, A31, A32, A33, and A34.

* * * * *